Figure 1:
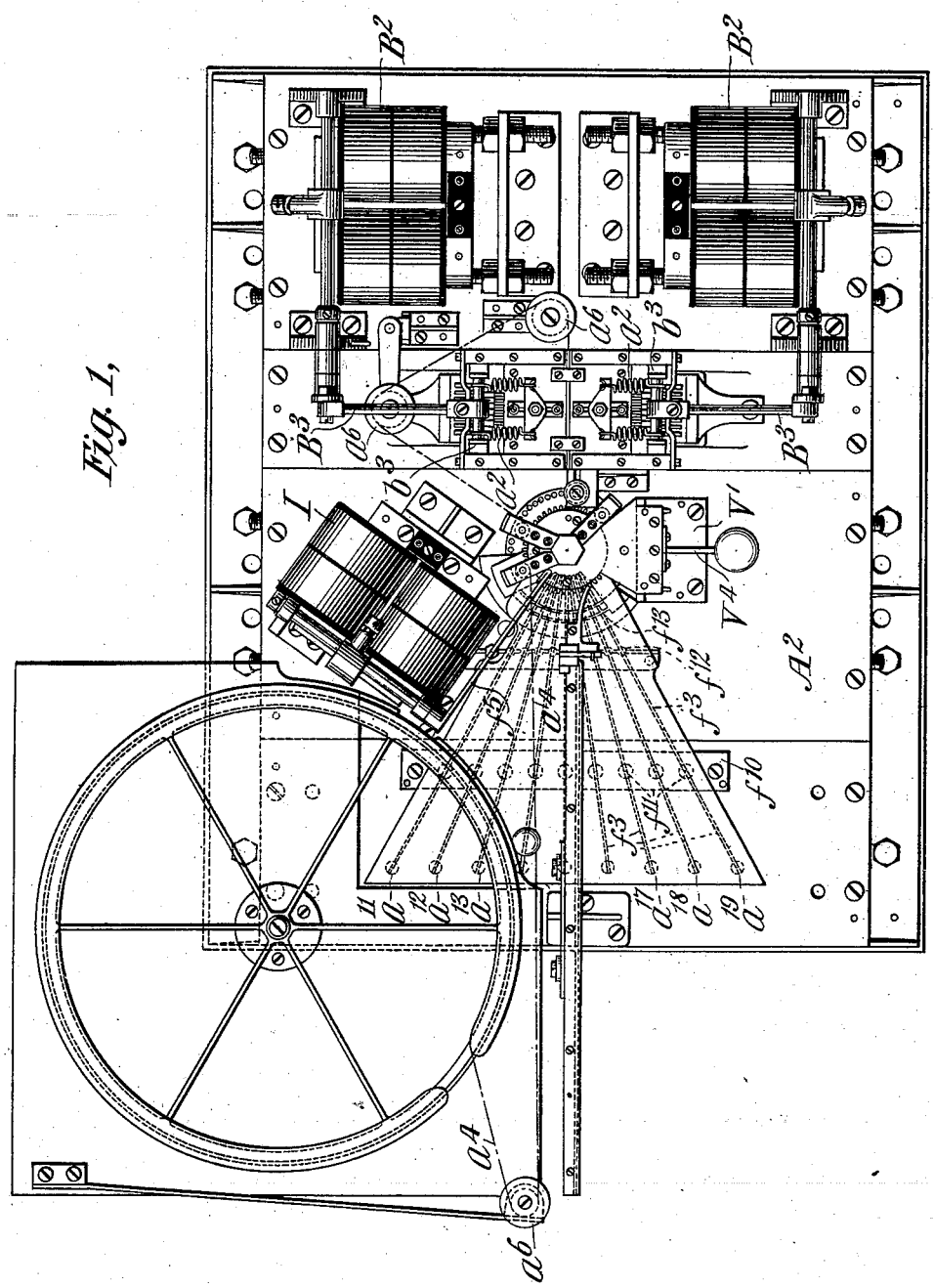

No. 657,510. Patented Sept. 11, 1900.
C. L. BUCKINGHAM & E. GERMANN.
PERFORATOR KEYBOARD.
(Application filed Jan. 13, 1898.)

(No Model.) 18 Sheets—Sheet 1.

WITNESSES:
C. E. Ashley
H. W. Lloyd

INVENTORS:
By their Attorney

No. 657,510. Patented Sept. 11, 1900.
C. L. BUCKINGHAM & E. GERMANN.
PERFORATOR KEYBOARD.
(Application filed Jan. 13, 1898.)

(No Model.) 18 Sheets—Sheet 5.

WITNESSES:
C. E. Ashley
H. W. Lloyd.

INVENTORS:
C. L. Buckingham
E. Germann
By their Attorney
C. L. Buckingham

No. 657,510. Patented Sept. 11, 1900.
C. L. BUCKINGHAM & E. GERMANN.
PERFORATOR KEYBOARD.
(Application filed Jan. 13, 1898.)
(No Model.) 18 Sheets—Sheet 6.
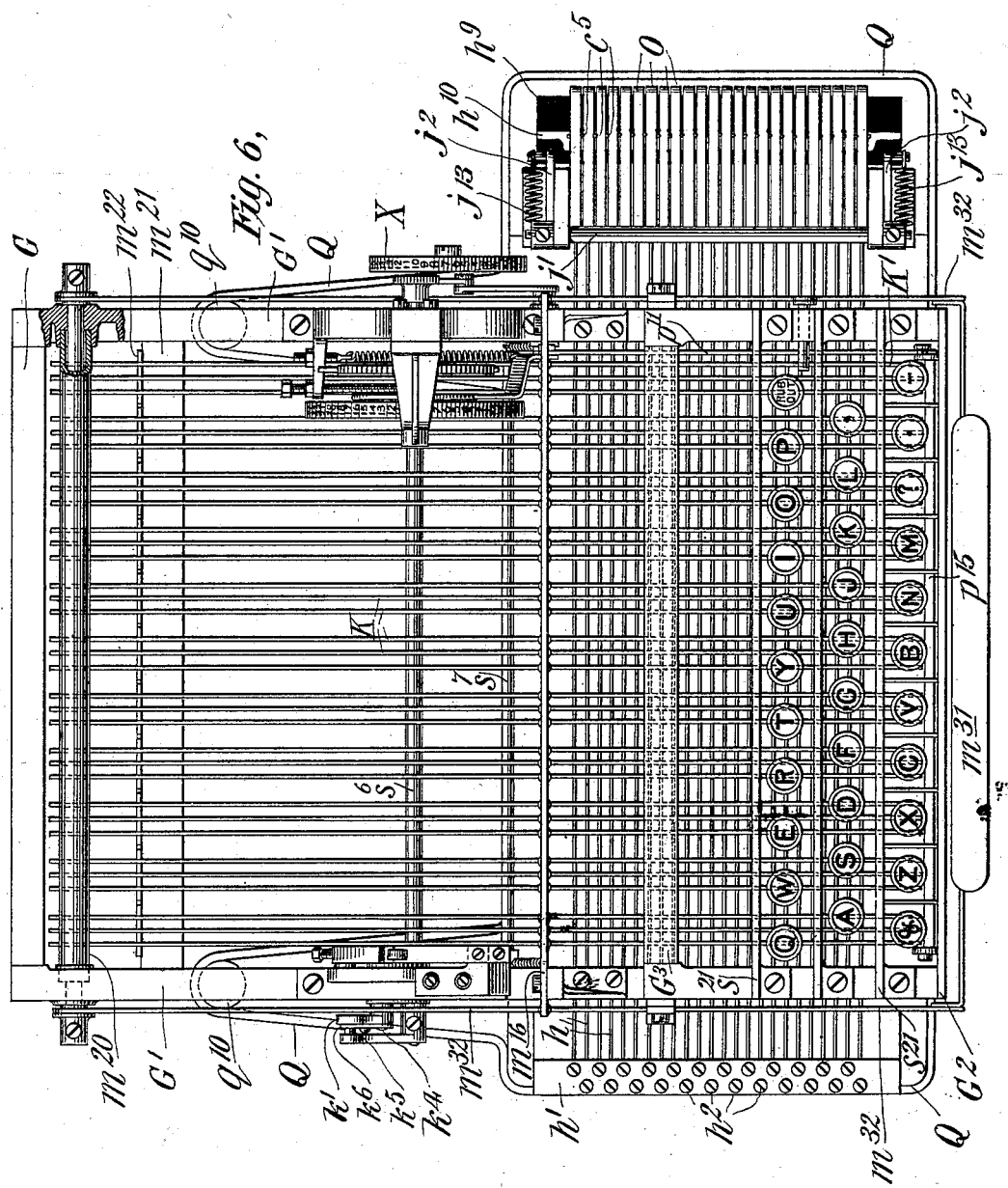
WITNESSES:
C. E. Ashley
H. W. Lloyd
INVENTORS:
By their Attorney

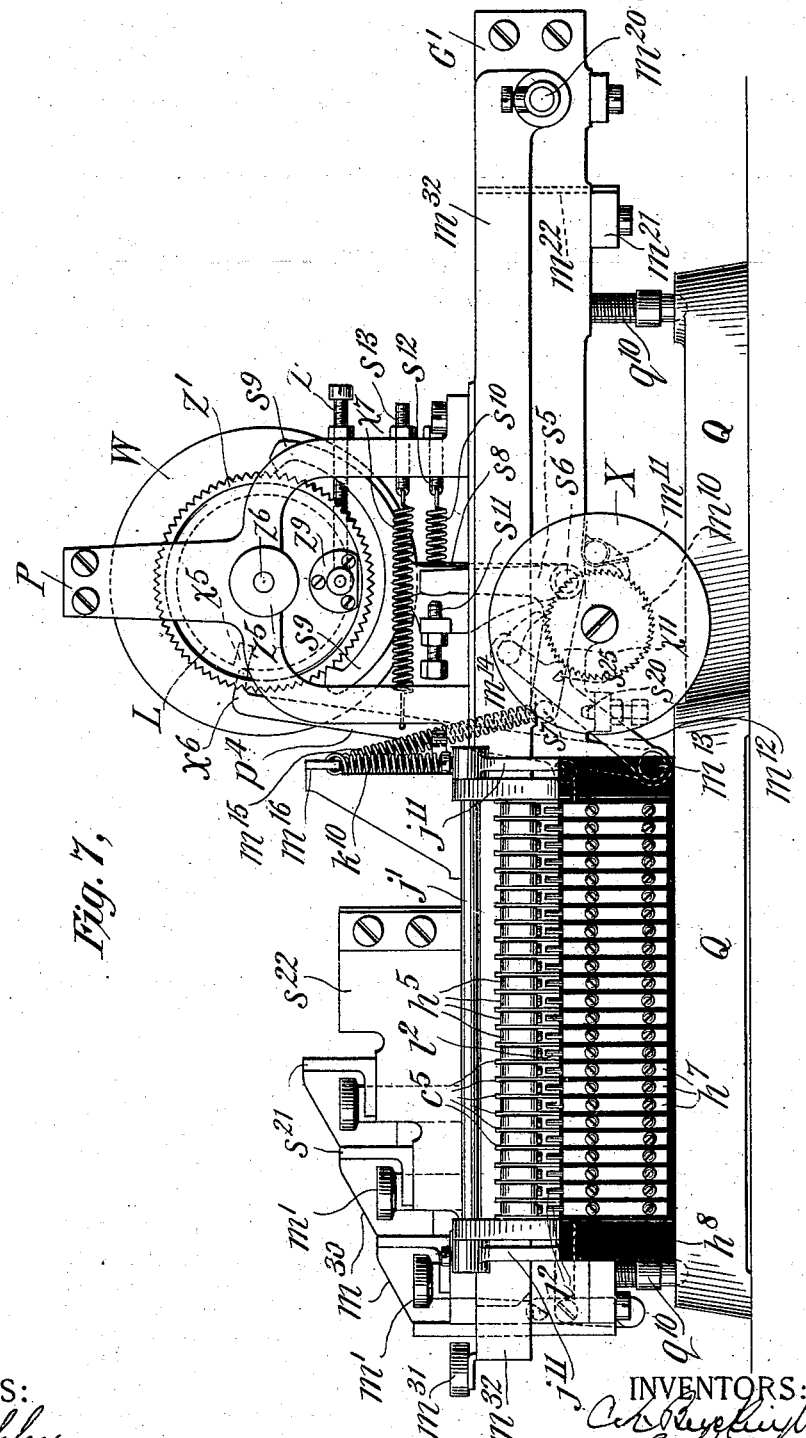

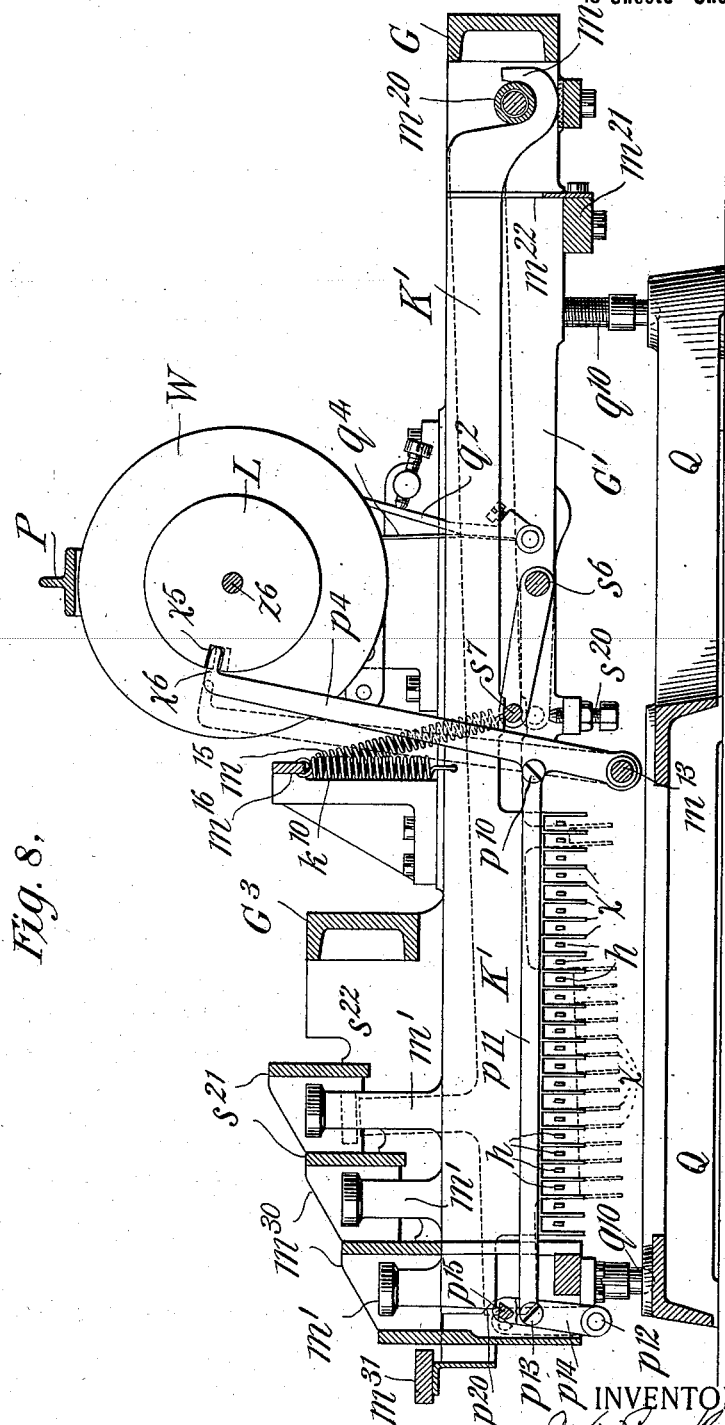

No. 657,510. Patented Sept. 11, 1900.
C. L. BUCKINGHAM & E. GERMANN.
PERFORATOR KEYBOARD.
(Application filed Jan. 13, 1898.)
(No Model.) 18 Sheets—Sheet 9.
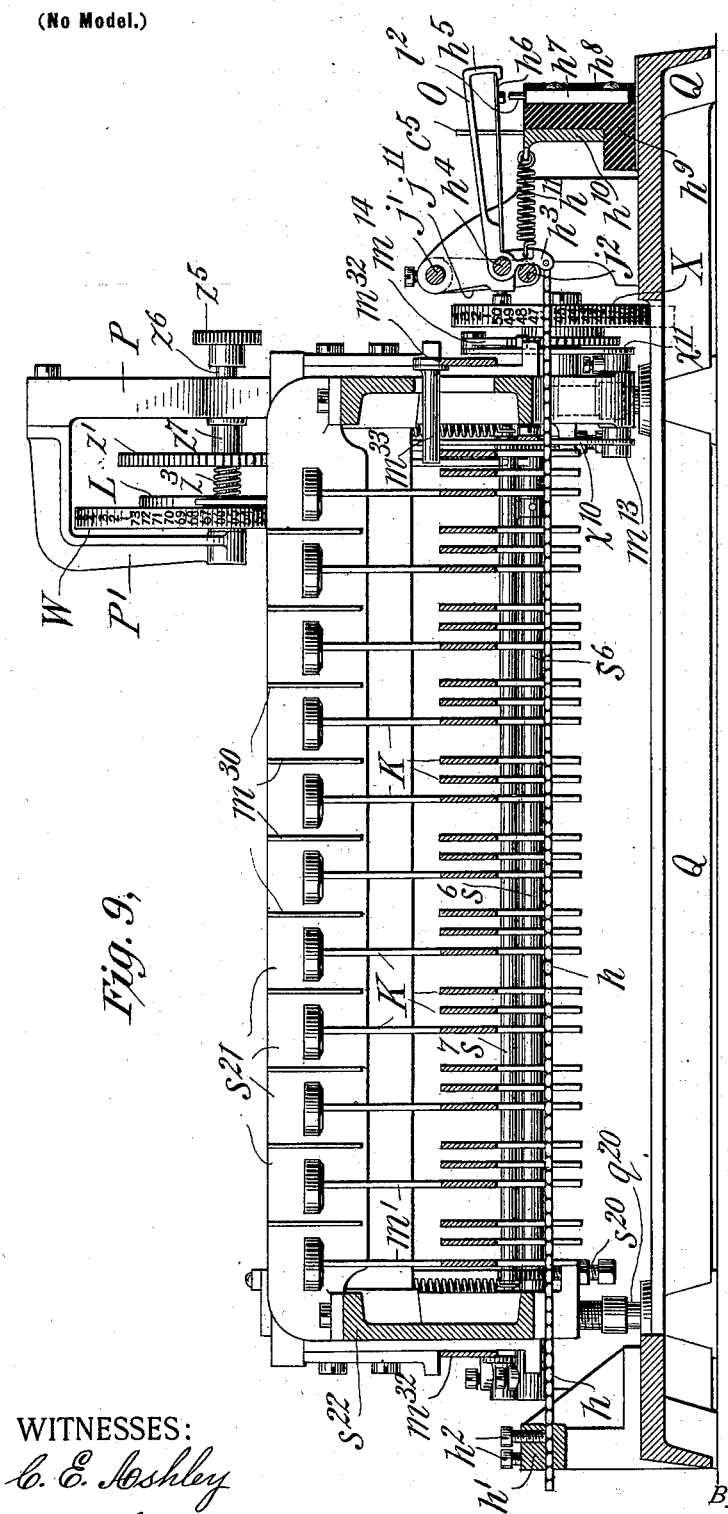
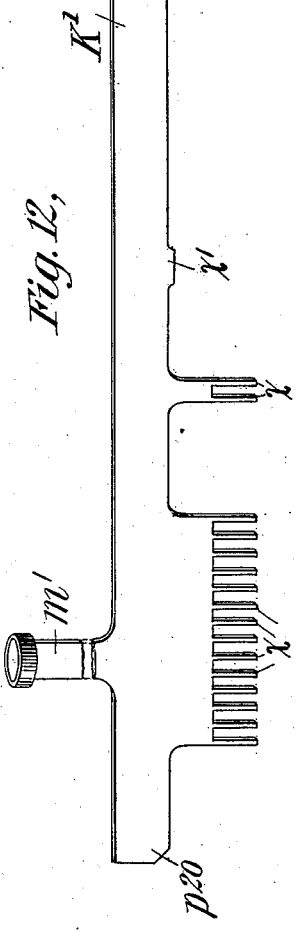
WITNESSES:
C. E. Ashley
H. W. Lloyd
INVENTORS;
By their Attorney

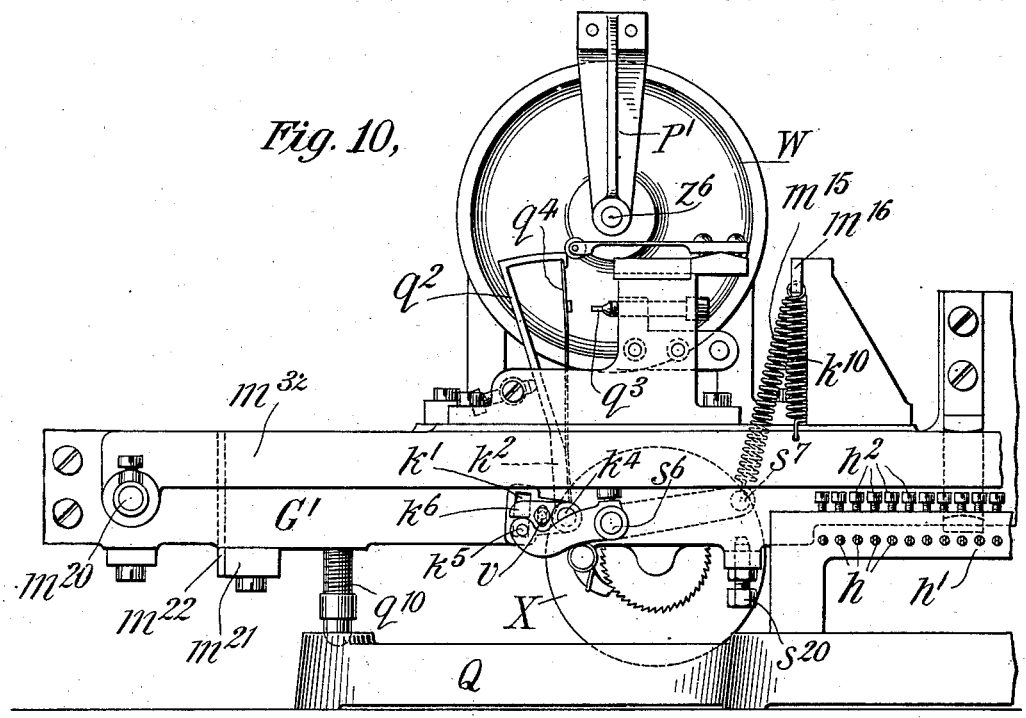
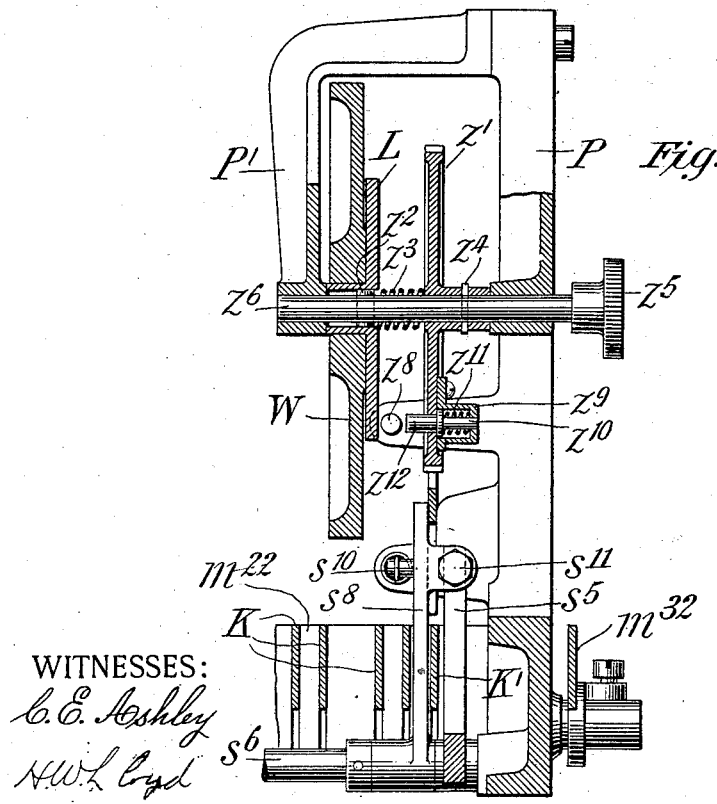

No. 657,510. Patented Sept. 11, 1900.
C. L. BUCKINGHAM & E. GERMANN.
PERFORATOR KEYBOARD.
(Application filed Jan. 13, 1898.)

(No Model.) 18 Sheets—Sheet 11.

WITNESSES:
C. E. Ashley
H. W. Lloyd

INVENTORS:
By their Attorney

No. 657,510. Patented Sept. 11, 1900.
C. L. BUCKINGHAM & E. GERMANN.
PERFORATOR KEYBOARD.
(Application filed Jan. 13, 1898.)

(No Model.) 18 Sheets—Sheet 12.

WITNESSES:
C. E. Ashley
H.W.L. Loyd

INVENTORS:
C. L. Buckingham
E. Germann
By their Attorney
C. L. Buckingham

No. 657,510. Patented Sept. 11, 1900.
C. L. BUCKINGHAM & E. GERMANN.
PERFORATOR KEYBOARD.
(Application filed Jan. 13, 1898.)

(No Model.) 18 Sheets—Sheet 13.

WITNESSES:
C. E. Ashley
John C. Sanders

INVENTORS
By their Attorney

No. 657,510. Patented Sept. 11, 1900.
C. L. BUCKINGHAM & E. GERMANN.
PERFORATOR KEYBOARD.
(Application filed Jan. 13, 1898.)
(No Model.) 18 Sheets—Sheet 14.

WITNESSES:
C. E. Ashley
H. W. Lloyd

INVENTORS:
By their Attorney

No. 657,510. Patented Sept. 11, 1900.
C. L. BUCKINGHAM & E. GERMANN.
PERFORATOR KEYBOARD.
(Application filed Jan. 13, 1898.)

(No Model.) 18 Sheets—Sheet 15.

WITNESSES:
C. E. Ashley
H. W. Lloyd

INVENTORS:
C. L. Buckingham
E. Germann
By their Attorney
C. L. Buckingham

No. 657,510. Patented Sept. 11, 1900.
C. L. BUCKINGHAM & E. GERMANN.
PERFORATOR KEYBOARD.
(Application filed Jan. 13, 1898.)

(No Model.) 18 Sheets—Sheet 17.

WITNESSES:
C. E. Ashley
H. W. Lloyd

INVENTORS:
C. L. Buckingham
E. Germann
By their Attorney
C. L. Buckingham

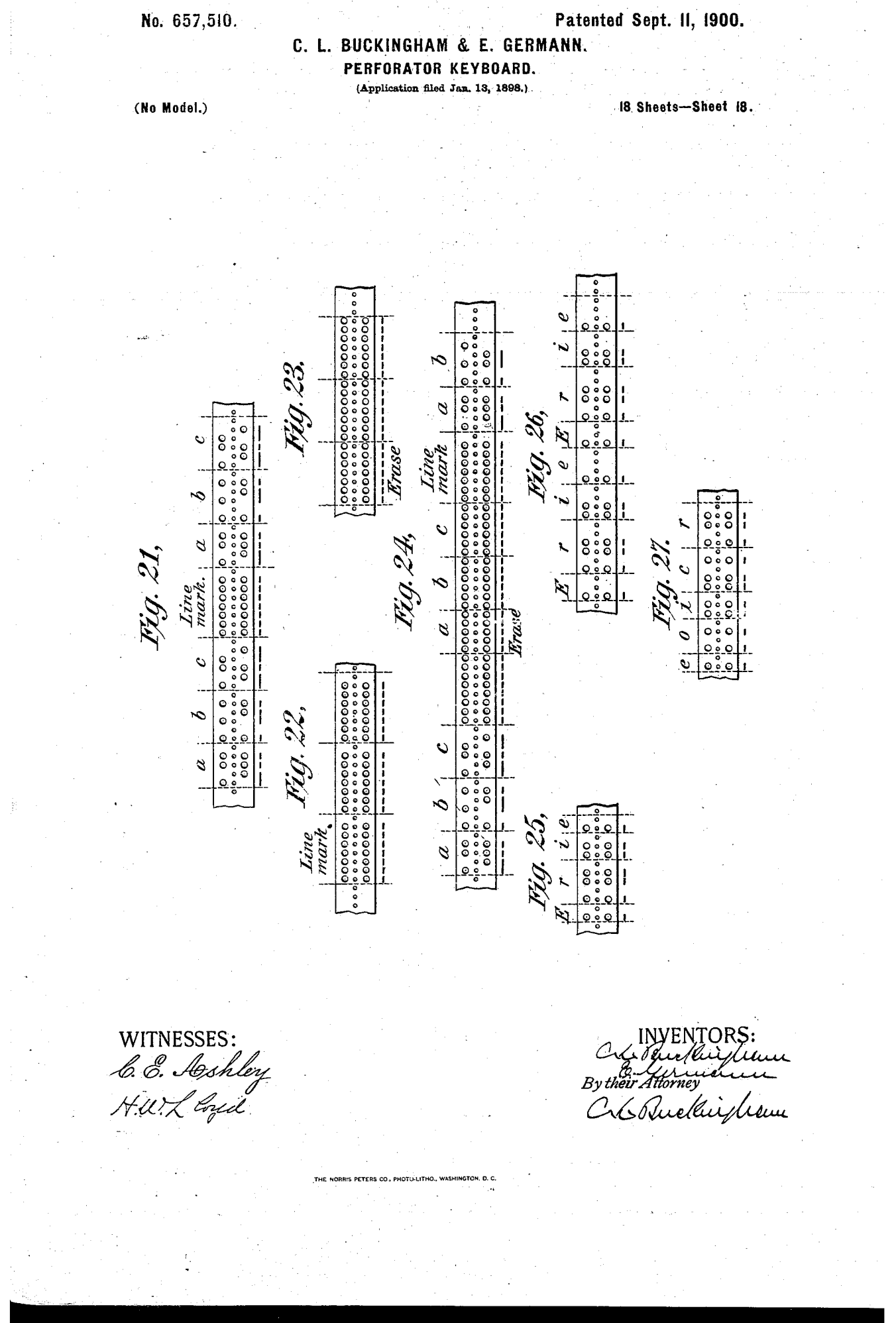

No. 657,510. Patented Sept. 11, 1900.
C. L. BUCKINGHAM & E. GERMANN.
PERFORATOR KEYBOARD.
(Application filed Jan. 13, 1898.)

(No Model.) 18 Sheets—Sheet 18.

WITNESSES:

INVENTORS:

By their Attorney

UNITED STATES PATENT OFFICE.

CHARLES L. BUCKINGHAM AND EMIL GERMANN, OF NEW YORK, N. Y.; SAID GERMANN ASSIGNOR TO SAID BUCKINGHAM.

PERFORATOR-KEYBOARD.

SPECIFICATION forming part of Letters Patent No. 657,510, dated September 11, 1900.

Application filed January 13, 1898. Serial No. 666,553. (No model.)

*To all whom it may concern:*

Be it known that we, CHARLES L. BUCKINGHAM, of the city and county of New York, and EMIL GERMANN, of New York, (Brooklyn,) county of Kings, State of New York, citizens of the United States of America, have invented certain new and useful Improvements in Perforator-Keyboards, of which the following is a specification.

The perforating-machine shown in Figures 1 to 4 of the drawings is one of many which may be used with the invention herein claimed and is adapted to perforate holes in paper strips, in two rows, to form groups representing either the Morse alphabet, an alphabet by which messages may be transmitted and reproduced in type-written characters, or groups of holes of any desired arrangement.

The general object of our invention is to provide an efficient, cheaply-constructed, and rapidly-operating apparatus by which our perforating system may readily be adapted to prepare messages in different codes or to perforate strips of paper for other purposes; and to this end our keyboard is preferably constructed in two parts, one of which as a substructure is permanently connected or employed with the perforator proper, while the second part, forming a superstructure, is readily removable. The substructure is adapted to all codes and all alphabets; but the superstructure is individual in character and is so constructed that it may readily be removed and replaced in passing from one code to another, thus adapting our perforating system to many different codes by merely changing a small part of the apparatus. In Figs. 5 to 16 are shown the two parts of our keyboard and circuits for adapting the perforator to prepare messages in such manner that as received they may be printed in page form, while in Figs. 17 to 20 is shown the same substructure with a second different part adapting the system to the Morse alphabet. Superstructures for other codes or for perforating paper for other than telegraphic uses might be shown; but the invention, we believe, is sufficiently illustated in the two instances here presented. Our invention, however, is not limited to the use of separate keyboard superstructures with a common substructure, as there are many novel devices found in the two forms shown in the drawings which we desire to claim.

In preparing messages for reproduction in page form by a printing-telegraph machine we have found it desirable to perforate a definite number of characters for each line and to interpose an arbitrary group of perforations in the transmitting-tape between the end of one line and the beginning of the next, and for this purpose we have provided a register or indicator which is combined with an automatic locking device by which the perforating operator may know the position he has reached in a line, while at the end of the line the keys are locked against further operation until the lock is manually released. In United States Patent No. 568,516, of September 29, 1896, an apparatus having a similar purpose is shown. In that case a type-writer carriage at the end of its line movement opens the circuit of the perforator, thus arresting further operation until the return of said carriage. In using such an arrangement, however, there is a loss of time and labor in moving the carriage back at the end of each line for the commencement of the next, while the apparatus itself is complicated and expensive. In our present arrangement by merely pressing a key at the end of each line the lock is released, and at the same time a group of holes marking the commencement of a new line is perforated, whereas one or more keys must be pressed to mark the beginning of a new line after the type-writer carriage has been manually returned. Moreover, in the present arrangement while the register and locking apparatus are moved a step at a time by the keys as each is depressed the additional resistance offered is so slight as not to be noticeable by the operator.

Another novel feature of our keyboard for perforating messages which are to be recorded in page form is a register for indicating the number of lines in a message that have been perforated. This is an important adjunct of our perforator system, since in the preparation of long messages a blank space must be left in the tape of sufficient length at the end of each page to allow time for the paper sheet to be replaced by a new one in the receiving-printer, and such result we accomplish by means of a step-by-step register which is actuated a step at a time in conjunction with the movement of the locking apparatus at the end of each line.

We have also shown as a part of our present invention a means whereby the space between letters and words may be increased in perforating messages. This is an indispensable feature in preparing messages for transmission by the American Morse code, since in such code there are characters which include long spaces. In such instances double spacing before and after a letter often becomes necessary, while before and after a word containing double spacing between letters the normal spacing must be increased. This we accomplish by giving each key of the keyboard a capacity to cause the perforating-machine to feed the paper tape a distance normally representing the character and also, at the will of the operator, a capacity to feed the paper an added distance, which should be the same for all characters. This feature is also important in adapting our perforator for preparing cipher messages, for, as a rule, double spacing is necessary between both letters and words to insure accuracy of transmission. In certain cases it may also be desirable to make a double space at the end of each letter in messages to be reproduced in type-printed characters.

Our keyboard also includes means whereby we are enabled to quickly rub out or obliterate any part of a message in which an error may have occurred and in such manner as to leave no trace of the error or rub-out on the printed page. In preparing printer messages each character of the code is terminated by a prolonged pulse, and the same is true respecting the arbitrary group of perforations employed to mark the commencement of each line. Preferably, we employ for this group seven pairs of holes in the transmitting-tape, representing short or dot pulses, which are followed by a blank space, representing the prolonged pulse. Such a group of perforations is distinctive in appearance and is of sufficient length that while it is passing through the transmitter the sheet of paper in the printer may be fed from the end of one line to the beginning of the next. Moreover, the prolonged pulse at the end of the group serves to actuate the feed mechanism of the printer an additional letter-space without bringing the platen into action. If for any cause an error is made in perforating a line, the feed-wheel of the perforator is disengaged from its driving mechanism, thus leaving it free to be rotated backward until the group of perforations representing the commencement of the line has been returned within the punch-head, and thereafter the feed-wheel is reëngaged with its driving mechanism, and the tape, from the commencement of the line to a point beyond the error, is reperforated with holes representing short or dot pulses. This we call a "rub-out." Following such operation a new line is commenced, as if no error or rub-out had occurred, by pressing the key which makes the group of perforations marking the commencement of each new line. We also preferably employ the same key for the rub-out; but when using it for such purpose its operation must cause the feed-wheel of the perforator to move the strip one step less than it would in its normal operation, for otherwise a continuous series of dot perforations would not be produced. Currents from a tape thus prepared will not actuate the receiving-printer, nor would they, however long continued, in any manner affect the printed message, as during the transmission of a series of short pulses the printer merely remains quiescent.

The present improvements are particularly applicable to those machines shown in patents No. 568,512, of C. L. Buckingham, E. Germann, and J. W. A. Gardam, September 29, 1896, and No. 568,516, of C. L. Buckingham, J. Gardam, and E. Germann, September 29, 1896, and in an application for patent, Serial No. 666,552, filed by us, of even date herewith, the essential features of which are shown in Figs. 1 to 4 of the accompanying drawings.

Our invention also includes various other improvements, as will more fully appear from the following description and claims.

Figure 2:
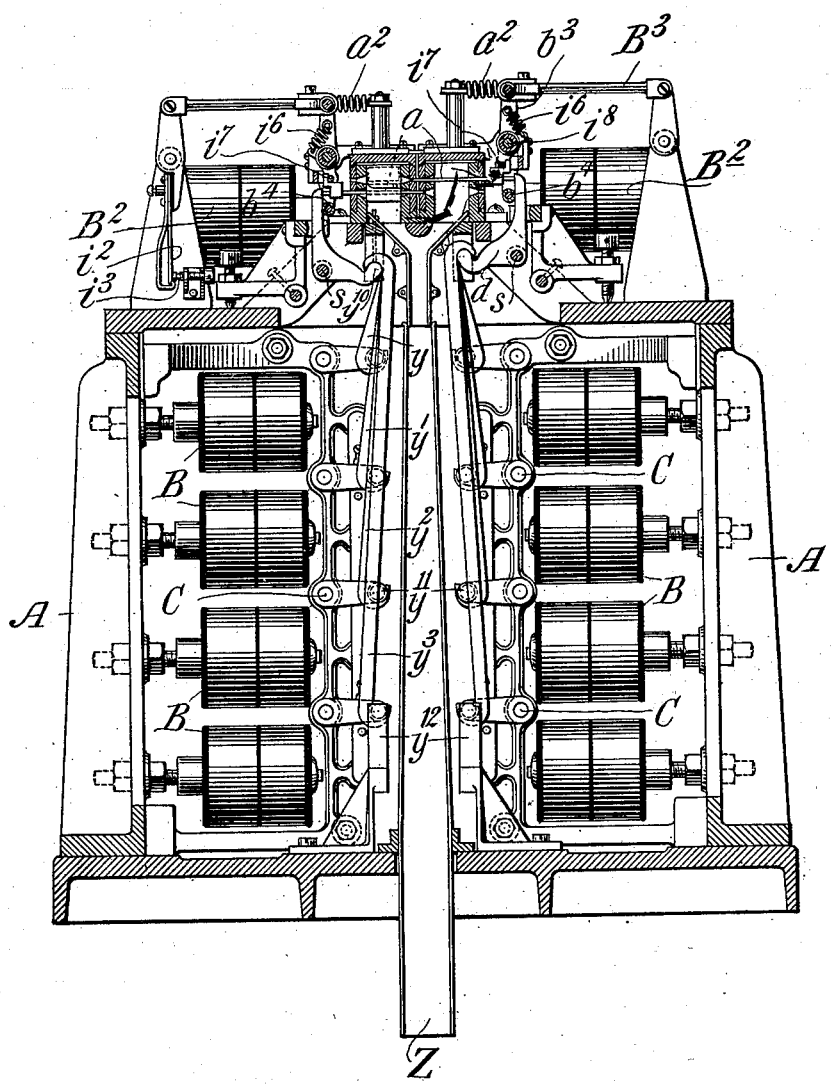
Figure 3:
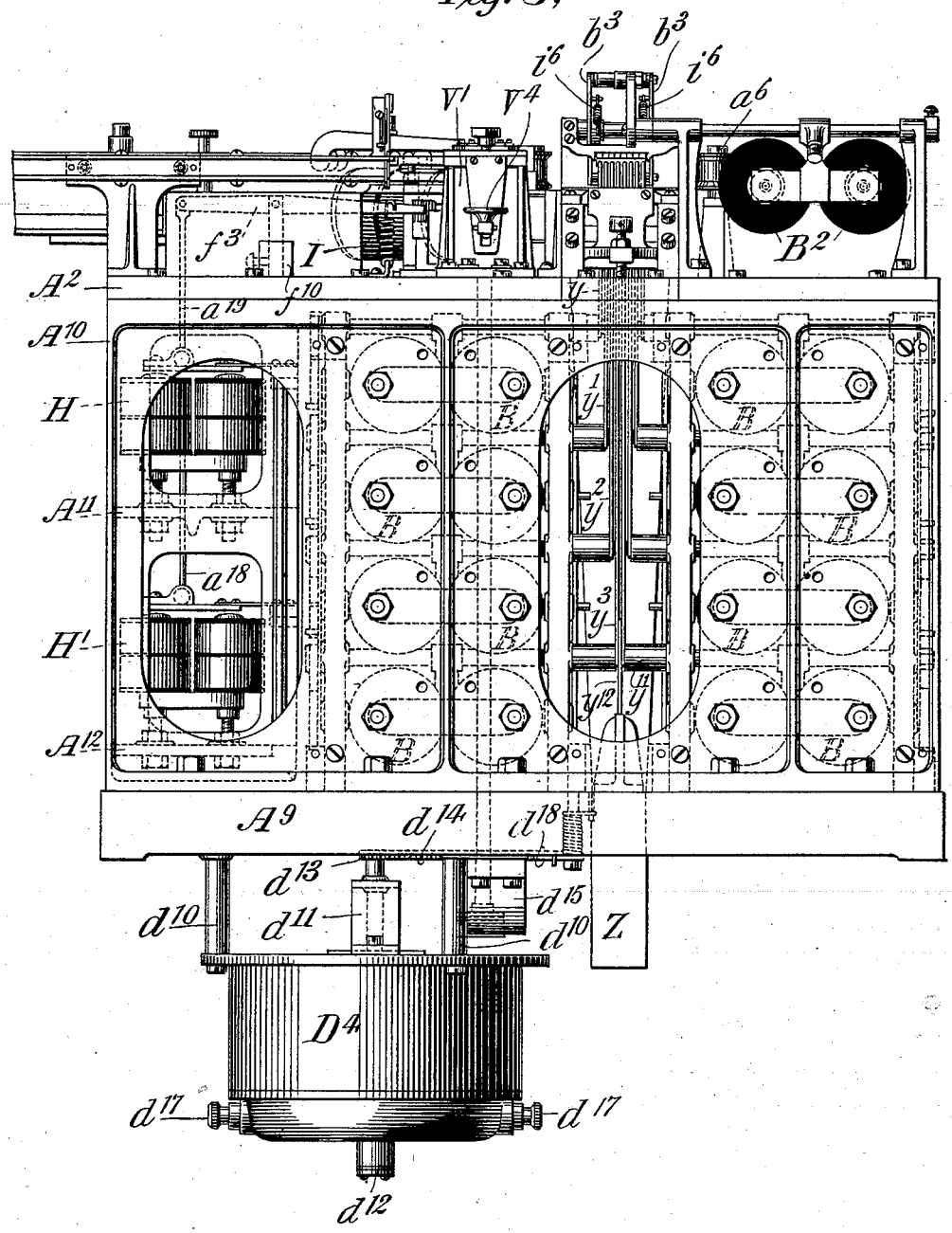
Figure 4:
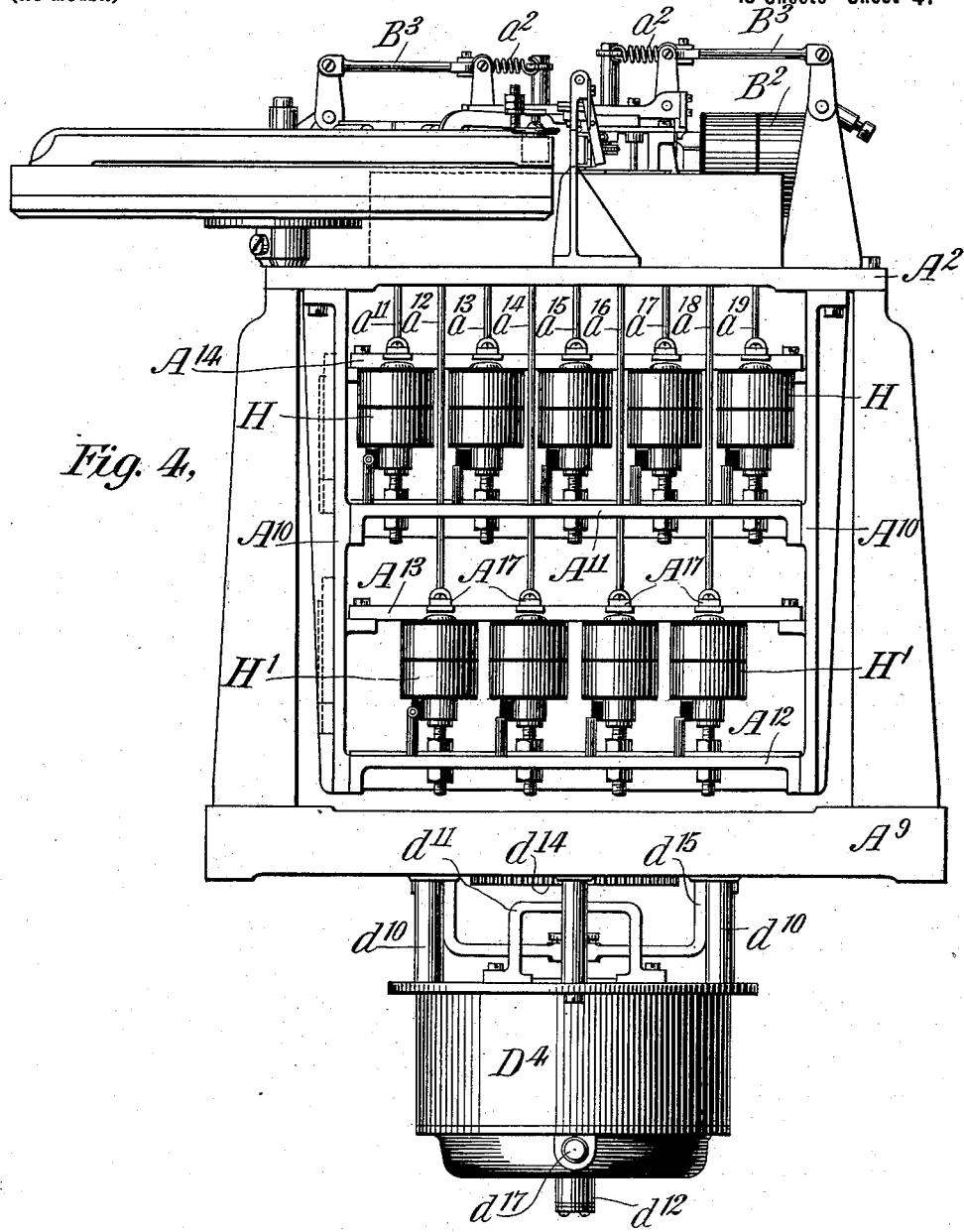
Figure 5:
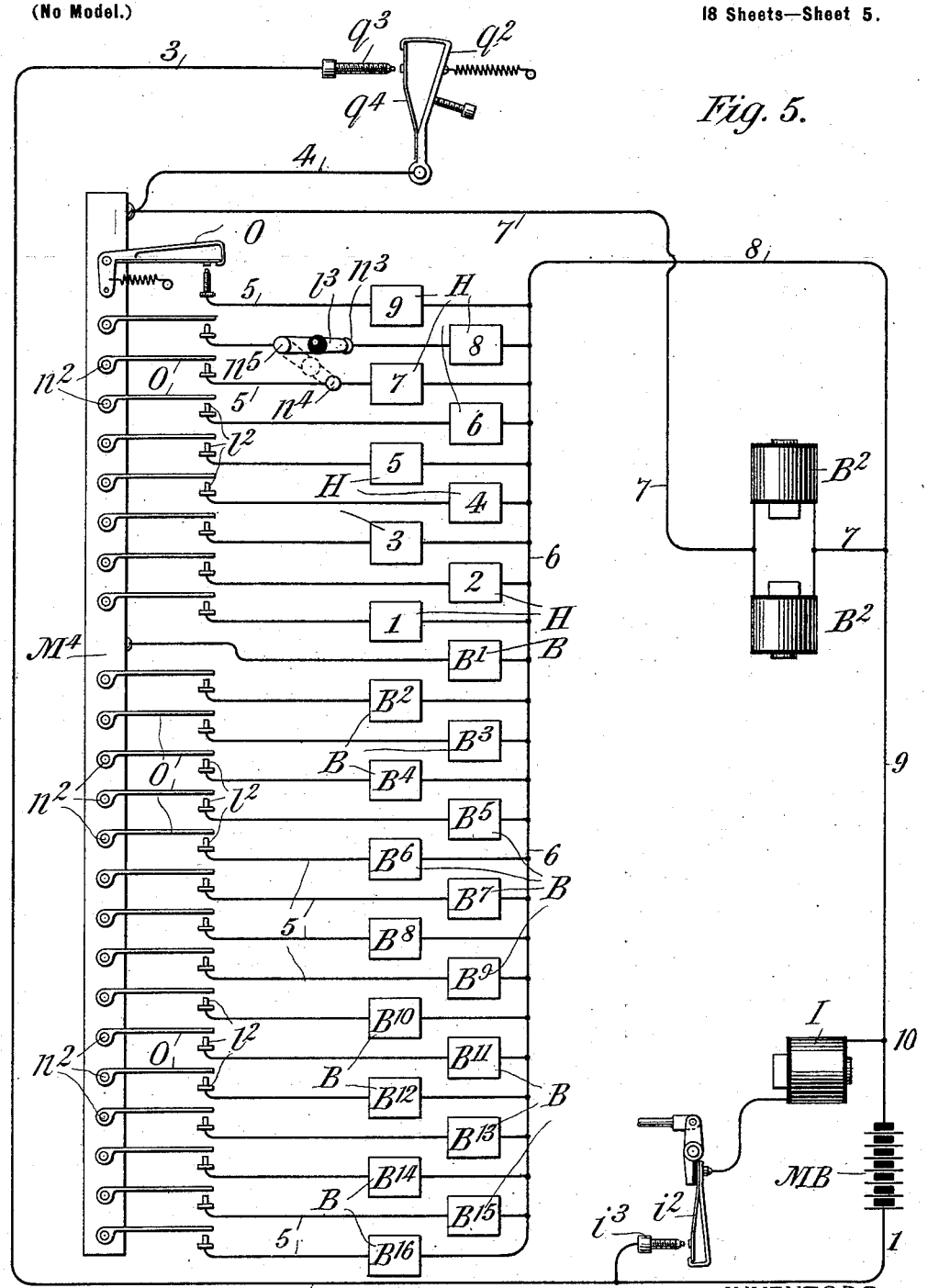
Figure 14:
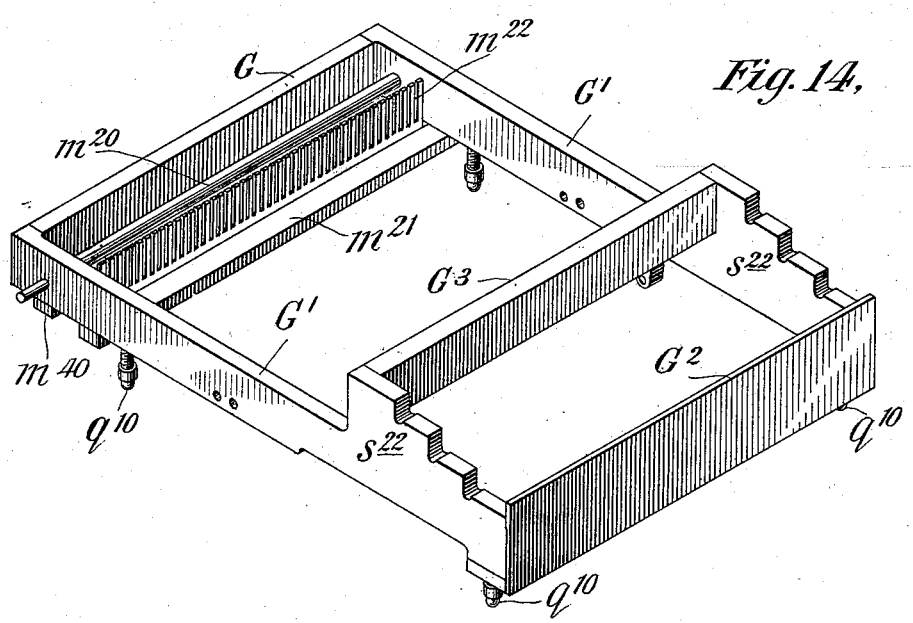
Figure 13:
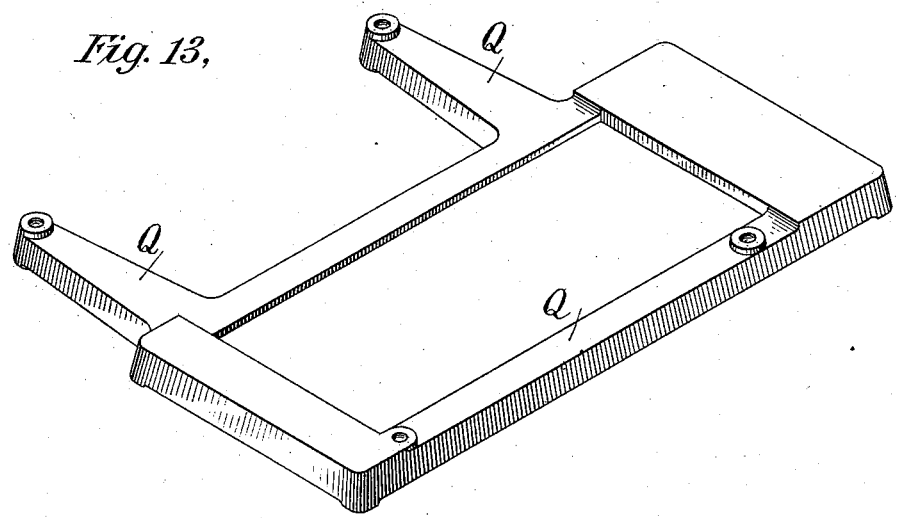
Figure 15:
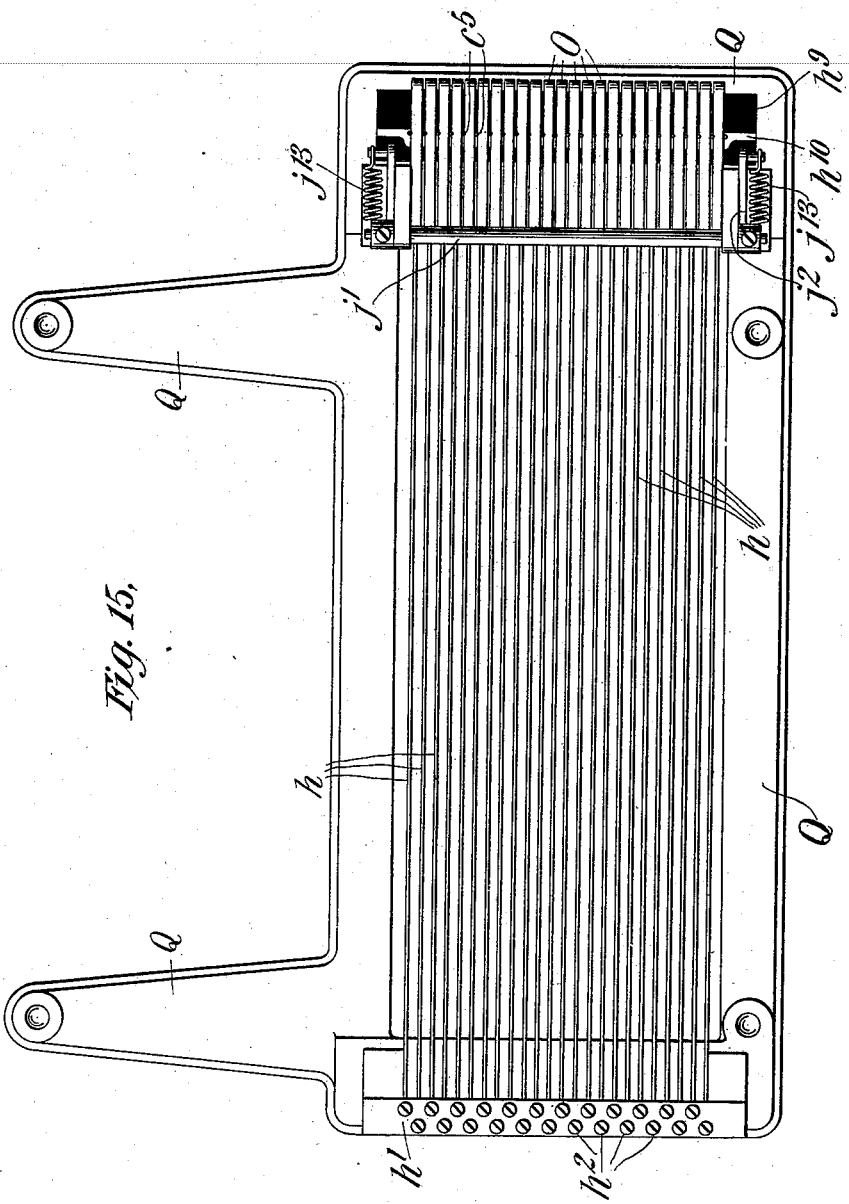
Figure 16:
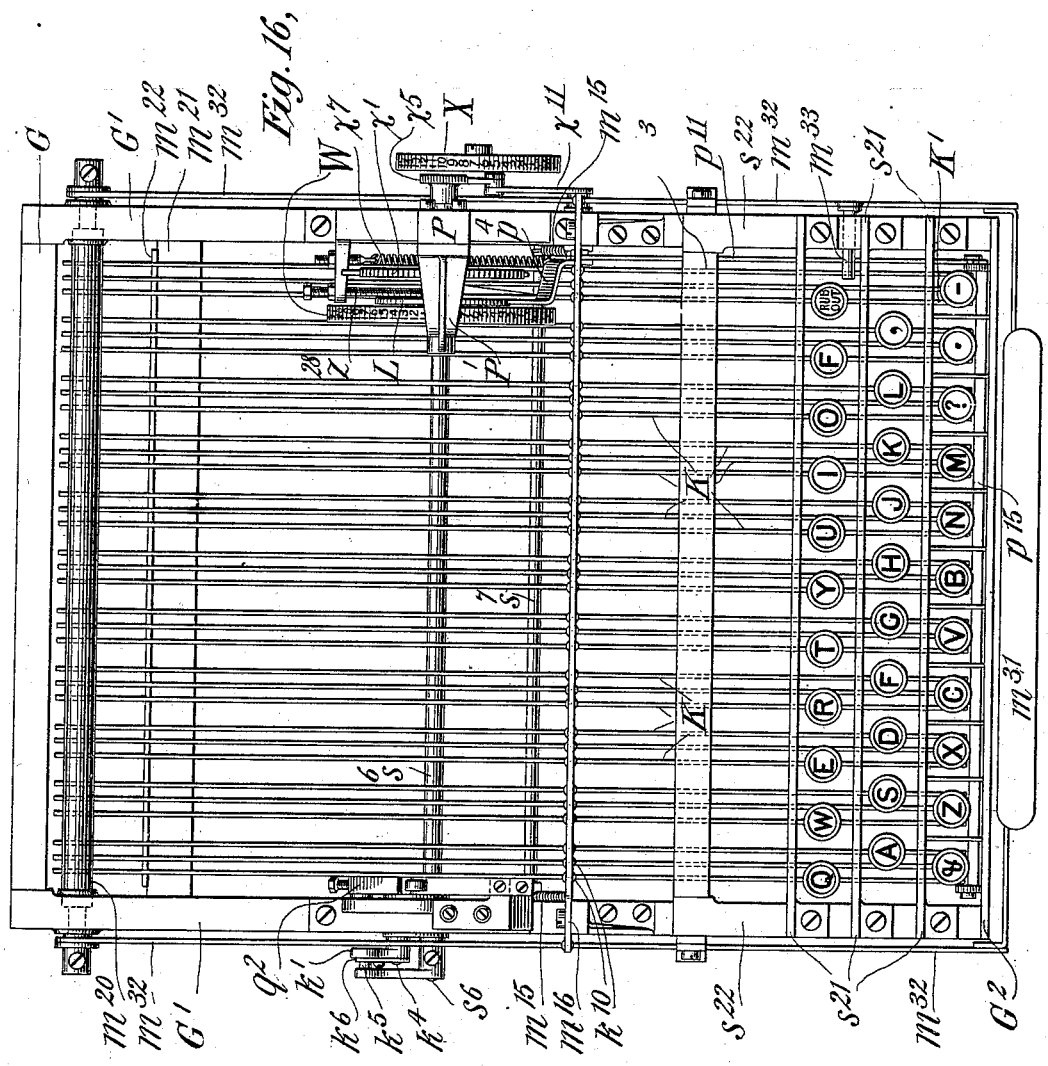
Figure 17:
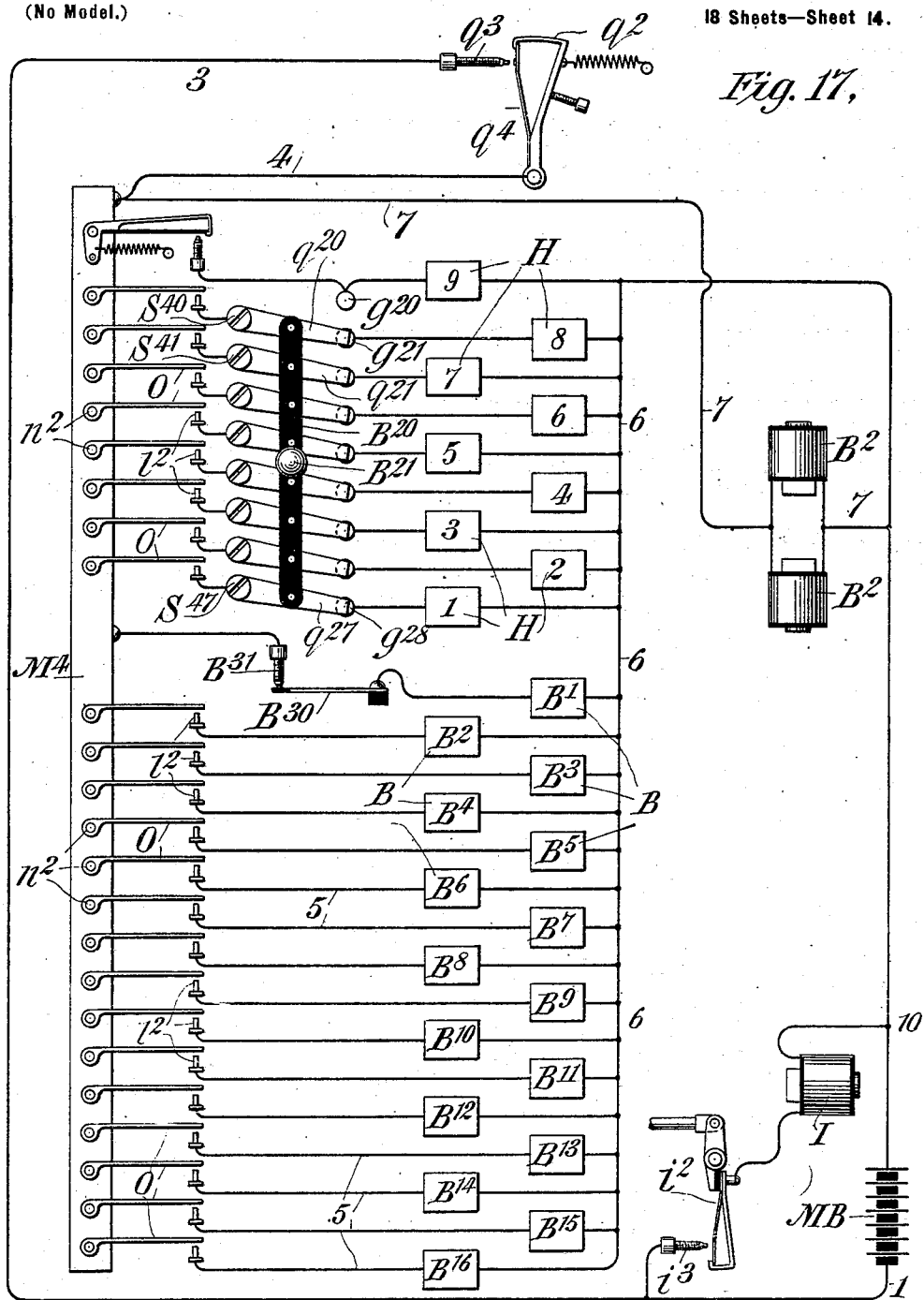
Figure 18:
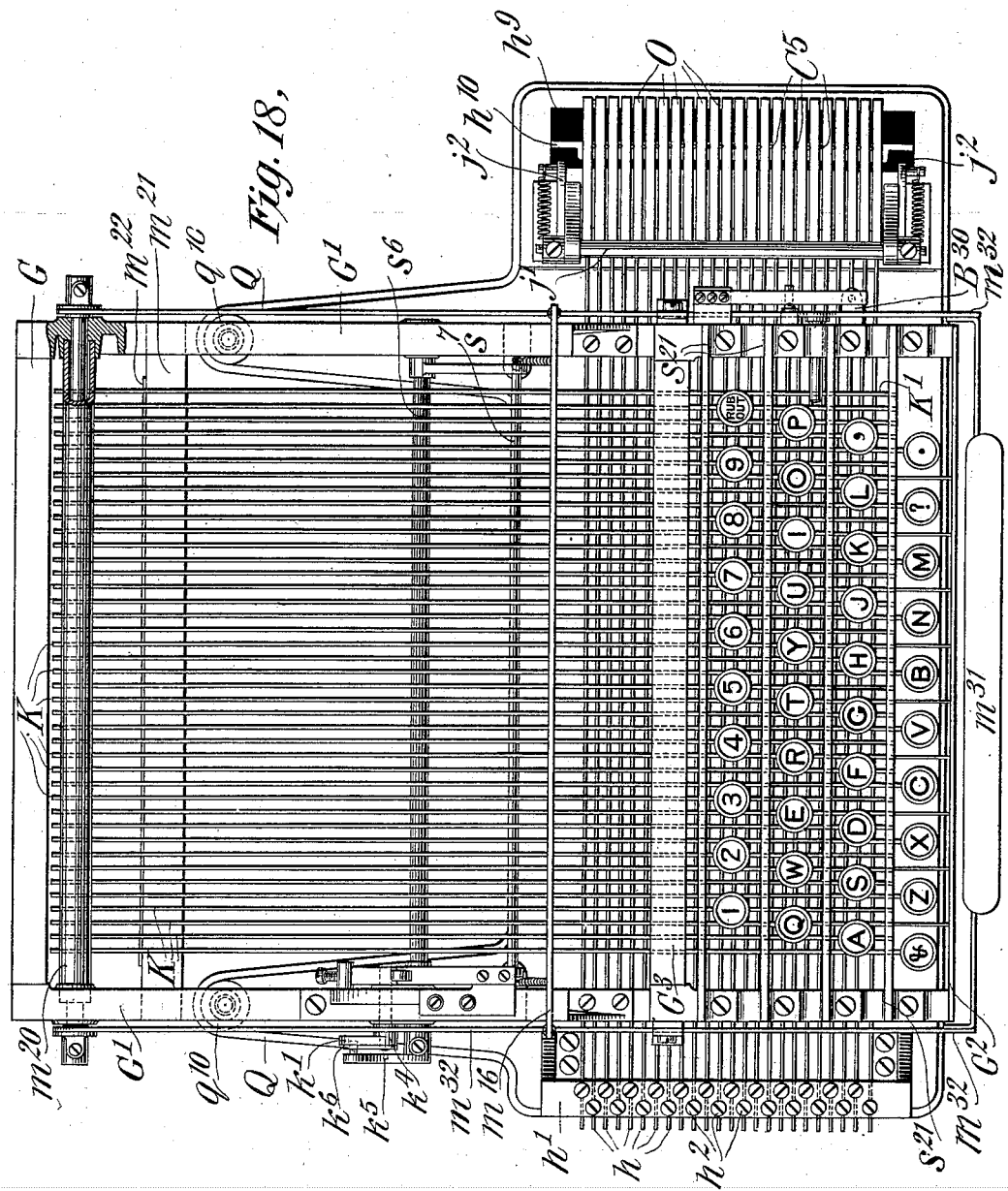
Figure 19:
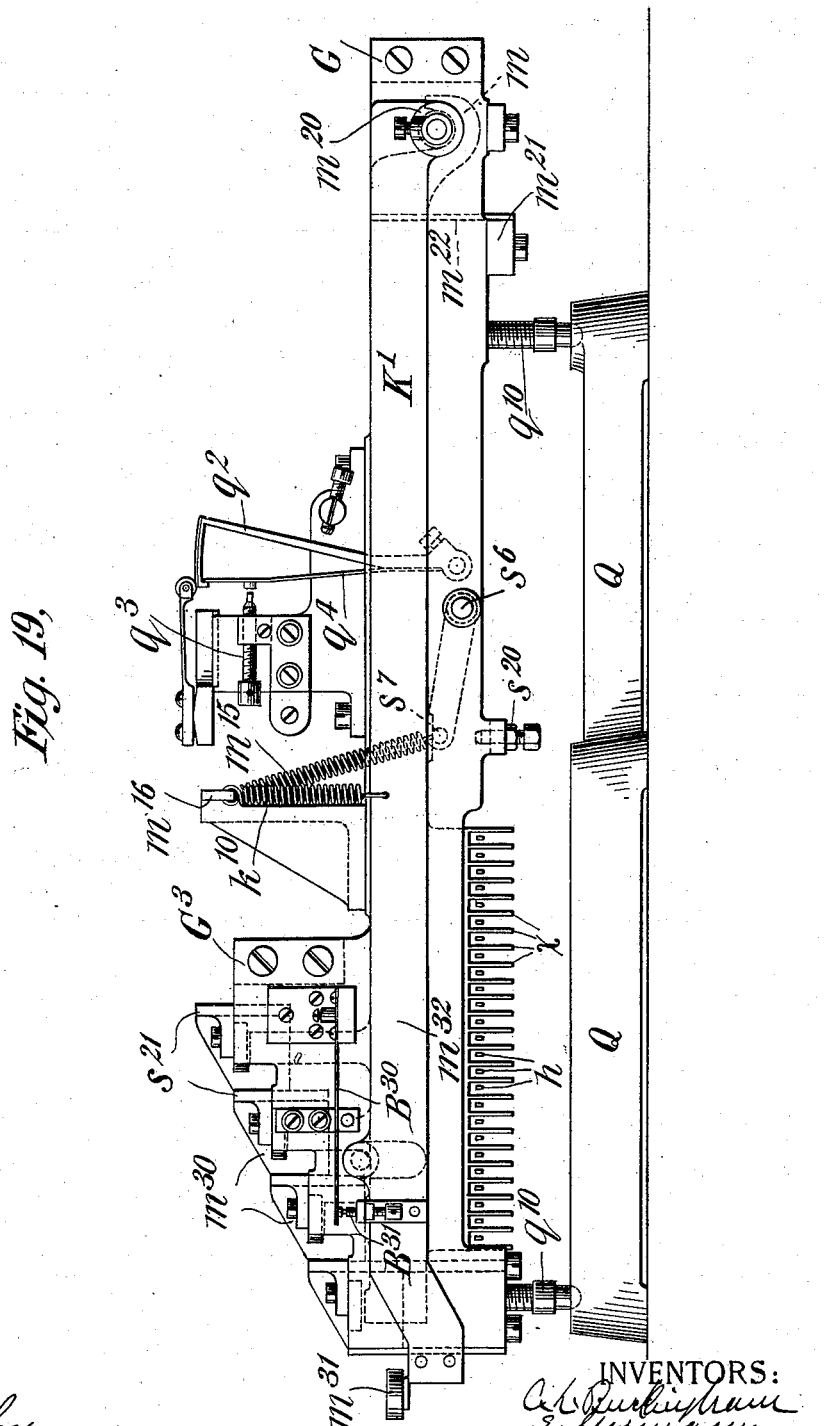
Figure 20:
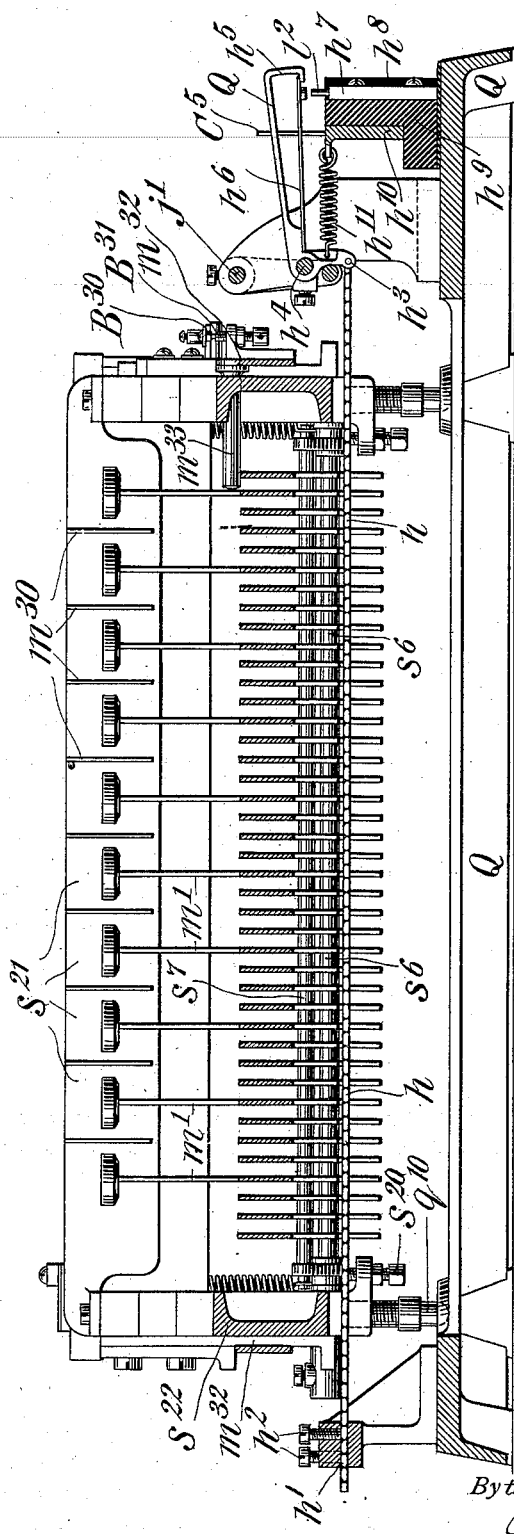

Referring to the accompanying drawings, Fig. 1 is a plan view of our perforating-machine, showing the top plate, punch-head, feed-wheel, and appurtenant devices mounted thereon. Fig. 2 shows a central cross-section of the punch-head and chip-chute and a side view of the punch magnets and links, reaching upward from the armature-shafts to the elbow-levers which actuate the punches. Fig. 3 is a side view of the perforator, showing the punch-head and appurtenant devices upon the top plate, the magnet system within the iron box, and the motor for actuating the feed-wheel, said motor being located beneath the bottom of the iron box. Fig. 4 is an end view of the perforator, showing the punch-head upon the top plate, the magnets within the iron box for controlling the variable step-by-step movement of the feed-wheel, an iron frame carrying such magnets, and the motor beneath the bottom of the box for actuating the feed-wheel. Fig. 5 represents a diagram of circuits, contact devices, and magnets for controlling the punches and feed action of the perforator when used for preparing messages to be reproduced in type-printed characters. Fig. 6 is a plan of our keyboard when adapted to prepare messages to be received in type-printed pages. Fig. 7 represents a side view of the apparatus shown in plan in Fig. 6, while Fig. 8 is a view showing a sectional portion of the keyboard represented in Figs. 6 and 7. Fig. 9 is a front view, partially in section, of the keyboard for preparing messages to be received upon a type-printer. Fig. 10 represents parts of the registering and locking mechanism and the common break apparatus of the keyboard for preparing printer messages, while Fig. 11 is a sectional view of parts shown in Fig. 10. Fig. 12 is side view showing the line-marking key of our keyboard when used for preparing type-printed messages. Fig. 13 shows the base plate or frame which forms a part of the substructure of our keyboard, upon which may be placed a superstructure adapted either for Morse messages or those to be received in printed form. Fig. 14 represents a part of the superstructure of our keyboard and is adapted to be used for preparing either Morse messages or those to be reproduced in type-printed characters. Fig. 15 is a plan view showing the base-piece of Fig. 13, upon which are placed the flexible cords or chains and corresponding contact-arms, which constitute the essential parts of the substructure of our keyboard. Fig. 16 is a plan view of the keyboard for preparing type-printed messages and is similar to Fig. 6, except that the permanent base-piece shown in Fig. 6 is omitted—that is to say, this figure shows a top view of the superstructure only, or that part which may be removed and replaced for different codes. Fig. 17 represents a diagram of circuits, contact devices, and magnets for controlling the feed action of our perforator for the Morse code, and in this diagram is particularly represented devices by which double or additional spacing between letters and words may be effected. Fig. 18 is a view of our keyboard adapted for Morse messages and corresponds with the view of Fig. 6. Fig. 19 is a view of the keyboard adapted for Morse messages and corresponds with the view of Fig. 8. Fig. 20 is also a view of the keyboard adapted for Morse messages and corresponds with the view of Fig. 9. Fig. 21 is a diagram showing the line-mark or group of perforations with which each line in a type-printer message is commenced, and also the letters "a" "b" "c" of the type-printer code on either side of said group. Fig. 22 is a diagram showing three repetitions of the line-mark group. Fig. 23 shows three repetitions of the line-mark group, with the spaces ending such groups omitted, thus representing an erasure or a rub-out. Fig. 24 shows the letters "a" "b" "c" of the printer-code at both ends of the tape, with an intermediate erasure or rub-out. Fig. 25 is a diagram representing the word "Erie" in the American Morse code, with single spacing between letters. Fig. 26 shows the word "Erie" once repeated, with double spacing between letters and an additional spacing between the two words. Fig. 27 shows some of those letters of the American Morse code which are of such design as to make double spacing necessary in words where they occur.

Since the perforating-machine shown in Figs. 1 to 4 of the accompanying drawings is described and claimed in another application filed by us of even date herewith, we desire to omit all claim thereto in this application, except as said machine or its parts are in direct combination with the specific improvements of our keyboard and appurtenant devices herein described. The punch-head of said machine is shown in plan view in Fig. 1 and in cross-section in Fig. 2. As here seen, the punch-head contains two rows of punches $a$, those at the right being thrust to the left to perforate holes in the upper margin of the paper strip, while those at the left are thrust to the right to perforate holes near the lower margin, it being understood that the paper strip is carried through the vertical slot between the two punches. As each letter is perforated, a blank portion of the paper strip having been previously moved within the punch-head, punches forming a group representing the character to be produced are driven through the paper and quickly removed therefrom, and immediately thereafter a feed-wheel is given a step of rotation of such length as to draw the paper strip through the punch-head a distance equal to the length of the character perforated. The feed-wheel has nine different movements, the longest being represented in the tape by nine holes in the central row of perforations, and the shortest by but one. Before depressing a key in perforating a character one of the teeth or pins of the feed-wheel is already lodged against a stationary stop, and while the punches are being driven through the paper a second pin of the feed-wheel is raised at a distance from the fixed stop representing the length of the character perforated. Immediately as the punches are removed from the paper an arm previously raised is pressed downward, thus disengaging the first pin from the fixed stop, whereupon the feed-wheel, under the action of a constant impelling force, is driven around until the second pin, like the first, is arrested, and this operation is repeated with the perforation of each character. With a feed-wheel having steps of rotation of nine different lengths all characters of the Morse code not exceeding the length of the period may be perforated, while if the feed-wheel were given ten or more different steps of movement and more than eight punches in a row were employed a message containing longer characters, as combinations of letters, &c., could equally well be prepared. As will be apparent from Fig. 1, the paper tape, within which a central row of perforations has already been prepared, first passes from a reel, thence over the peripheral teeth of the feed-wheel into the punch-head, again over the opposite side of the feed-wheel, and thence through a chute, from which the perforated tape is discharged from the machine. Briefly, the punches $a$ are actuated by elbow-levers $d$, which are pivoted on the two sides of the punch-head, as at $s$, there being one such lever for each punch. The lower horizontal arm of each lever $d$ has a rounded end $y^{10}$, over which the upper end of a link $y$, $y'$, $y^2$, or $y^3$ is hooked, while the lower end of each link is hooked beneath a crank-pin $y^{11}$, and thereby each punch is actuated by its magnet B, the armature of the magnet and the arm bearing the crank-pin being both rigidly affixed to a shaft C. Thus as many magnets B must be brought into action as there are holes in the tape representing the character, while at the same time magnets $B^2$ are energized, thereby putting springs $a^2$ $a^2$ under tension in such manner as to materially assist the withdrawal of the punches from the paper strip. As is seen in Fig. 2, the levers $d$ upon the downward pull of the links not only press the punches forward, but also press against horizontal rods $b^4$, which are carried by vertical frames pivoted at $i^8$, the upper ends $b^3$ of said frames being attached to springs $a^2$ on one side and to links $B^3$ on the other, wherefore as magnets $B^2$ are energized a pull is exerted upon $B^3$, which in turn is imparted to springs $a^2$. By this means the horizontal rods $b^4$ are moved by the magnets $B^2$, as well as by the elbow-arms $d$, and when current is removed from the magnets $B^2$ not only do rods $b^4$ strike against levers $d$ to drive them into back position, but rods $i^7$, carried with rods $b^4$ and the frames of which they are parts, engage with shoulders formed in blocks which are attached to the punches, and as the upper ends of the arms $b^3$ are moved inward toward the punch-head the pins $i^7$ so engaging with the blocks of the punches directly withdraw them from the paper. To the upper part of the frame bearing the pins $i^7$ are lugs to which springs $i^6$ are attached, said springs being also connected with the upper ends of the arms $b^3$, whereby as said arms $b^3$ are moved springs $i^6$ are put under sufficient tension to withdraw the punches. Beneath the punch-head is a vertical chip-chute Z Z, and through this the chips are dropped as they fall into the two cavities, one on each side of the die-plates. The paper tape $a^4$ as it is drawn from the reel passes over an idler $a^6$ at the left, over one side of the feed-wheel, the two additional idlers $a^6$, through the punch-head, over the opposite side of the feed-wheel, and thence into the stationary chute, through which the tape is delivered from the machine. The feed-wheel for moving the paper tape is shown in Fig. 1, as are the radial arms $f^3$, pivoted at $f^{11}$, by which any one of the nine pins of the feed-wheel next to the fixed stop may be raised. The outer ends of said levers $f^3$ are pivoted to downwardly-projecting links $a^{11}$ to $a^{19}$, while near their inner ends they are held and guided by the teeth $f^{13}$ of a comb, the latter being mounted upon base-plate $A^2$. Fig. 1 also shows an arm $f^5$, which is raised by magnet I as each character is perforated and which is depressed by a spring after the punches are withdrawn from the paper tape, thus depressing that pin of the feed-wheel which has been lodged against the fixed stop and permitting the feed-wheel to rotate until the pin last raised is arrested by said stop. The radial arms $f^3$ for lifting the pins of the feed-wheel are normally held at their inner ends in a downward position by spiral springs, the outer ends of said bars, and with them the links $a^{11}$ to $a^{19}$ and the armature attached thereto at their lower ends, being held in an upward position within working distance of the poles of magnets H H', as shown in Figs. 3 and 4. As shown in Fig. 4, there is a magnet for actuating each radial arm, and these magnets are placed in two horizontal ranges, one being mounted upon the plate $A^{11}$ and the other upon a lower plate $A^{12}$, while the armatures of said magnets are pivoted upon the two plates $A^{14}$ and $A^{13}$. The four plates bearing the feed-magnets and their armatures are supported by side plates $A^{10}$, thus forming a crate or frame which is supported from the under side of the top plate $A^2$ by screws and which is readily removable. The top plates of the perforator are supported upon side plates A, as shown in Fig. 2, and these in turn rest upon an iron base-plate $A^9$, beneath which is seen, in Figs. 3 and 4, a motor $D^4$, which is supported by rods $d^{10}$ and which, through a spur-wheel $d^{13}$, communicates movement from its armature to a vertical shaft extending upward and through the top plate of the perforator to the feed-wheel. The lower end of said shaft is supported or stepped in a bracket $d^{15}$, while a bracket $d^{11}$ is employed as the upper journal-bearing of the motor-shaft, the lower end resting in a cup $d^{12}$. The commutator-brushes of said motor are shown at $d^{17}$. We have also partially shown in Figs. 1 and 3 the disengaging apparatus by which the feed-wheel is disconnected from its driving-shaft, and thereby from the impelling influence of the motor, thus freeing the feed-wheel, so that the paper tape may be drawn forward or backward within the punch-head. This feature, with many others, however, we have not shown in detail, as they are fully described and illustrated in our said other application of even date herewith.

Having now briefly described one form of perforating-machine to which our present improvements are applicable, we will explain the keyboard which we employ, its manner of construction, and our plan for adapting the perforating system to any one of many different codes, or for purposes other than the preparation of telegraphic messages. To illustrate the plan by which with only a small change in apparatus we may readily pass from one code to another, we have shown apparatus for perforating either the Morse alphabet or an alphabet for preparing messages to be received in page form upon a type-printer. To this end we employ with the perforating-machine shown in Figs. 1 to 4 a base-piece or substructure forming a part of our keyboard with circuit connections and devices which are permanently attached to a table or other support, and upon this substructure of the keyboard is placed a superstructure which is individual in character and adapted to but one code.

Fig. 13 shows a base-plate Q, preferably an iron casting, which is also seen in various views in Figs. 6, 7, 8, 9, 10, 15, 18, 19, and 20. Figs. 9, 15, and 20 particularly show such base-plate and a series of chains or cords mounted thereon, which at their left ends are permanently fixed to a bar $h'$ by binding-screws $h^2$. The opposite ends of said chains at the right are attached to the lower ends $h^3$ of contact arms or levers O, the latter being pivoted at $h^4$. The chains when tightened assume a practically-horizontal position and tend to depress the free ends of the levers O, while springs $h^{11}$ pull in the opposite direction and tend to raise levers O. There is a spring for each contact-lever, and all are attached to an anchor-bar $h^{10}$, which is mounted upon and attached to an insulating-block $h^9$, within which, at the right side, are embedded a series of small metallic bars $h^7$, there being one for each contact-lever O. Said bars $h^7$ respectively form terminals of the separate circuits extending from the respective punch-actuating and feed-controlling magnets of the perforator and are insulated from each other by thin leaves $h^8$, which project from and form a part of block $h^9$. Each contact-arm is provided with a downwardly-projecting hook $h^5$, which normally holds spring $h^6$ in an upward position, and while bars $h^7$ are insulated each from the others the springs $h^6$ have a common connection with the metallic frame of the keyboard. Figs. 6, 7, 9, 18, and 20 also show an auxiliary frame, which is supported on a rock-shaft $j'$ and is provided with two downwardly-projecting arms $j^{11}$ and a movable cross-bar $j^2$, which under pressure of springs $j^{13}$ bears against a concave seat in each and all of the downwardly-projecting arms $h^3$ of levers O, thereby acting, in conjunction with springs $h^{11}$, as a common retractor to tighten chains $h$ and to lift the free ends of said levers and the contacts $h^6$ from contacts $l^2$. We have found, however, that such auxiliary retractor is not essential and that the contact-levers O may be sufficiently balanced and controlled by the pull of the chains $h$ from the left and the springs $h^{11}$ from the right. It will also be seen from the drawings that the levers O are kept apart and in their respective planes by comb-teeth $C^5$, which may be made of pieces of iron wire set in bar $h^{10}$ or $h^9$. In our said keyboard, excepting the magnet for actuating the upper left punch in the perforating-machine, a chain $h$ and lever O are employed for each punch-actuating and each feed-controlling magnet. The one chain and one lever are omitted for the reason that the magnet for operating the first upper punch in preparing printer messages should be and is called into action in all cases when a key is depressed.

This being the case, the circuit to this magnet is opened and closed at the common break apparatus, particularly shown in Fig. 5, which at every operation of a key closes and breaks the common conductor into which the multiple branches of the punch and feed controlling magnets are united. The assisting-magnets $B^2$ are also in normally-closed branches like punch-magnet B and are likewise brought into action with each vibration of the common breaking device $q^2$ $q^3$ $q^4$. A chain $h$ and lever O might be employed for the first punch-magnet B and also a chain and lever for each of the assisting-magnets; but their employment would only lead to a complication of apparatus and unnecessary expense. Moreover, by omitting chains the keys become much easier to the touch of the operator. In preparing Morse messages, however, there is one instance when the first upper punch of the perforator should not be operated upon depressing a key. This is when the space-key is operated for feeding the paper tape the space of one or more holes in the central row of perforations. Thus, in this instance, if the first punch-magnet were brought into action by the common break a perforation not desired would be made by said magnet upon actuating the space-key. To avoid this difficulty without employing a chain in connection with the first upper punch-magnet, we employ a breaking-contact which is actuated to break the circuit of the first upper punch-magnet at each depression of the space-key. This device we have shown in Figs. 16 to 20. As shown in these figures, B' represents the first punch-magnet of the upper row, while $B^{31}$ is a contact against which normally presses a spring $B^{30}$. The contact $B^{31}$, however, is affixed to the space-key frame $m^{32}$ and is depressed away from the spring $B^{30}$ each time that the space-key is operated, thus breaking the circuit of said punch-magnet before circuit is closed by the common break, and thereby preventing the operation of said magnet. As in Fig. 5, the common break of Fig. 19 shows a spring $q^4$, which is brought into contact with a set-screw $q^2$ as arm $q^3$ is vibrated to the left.

Referring now to Figs. 5 and 17, it will be seen that the circuits of the feed-magnets H' to $H^9$ and the perforator-magnets $B^2$ to $B^{16}$ are joined with normally-open contacts $l^2$, the latter being shown in Figs. 7, 9, and 20 as extensions of the metallic connecting-bars $h^7$. In the arrangement of Fig. 5, which shows circuits for the keyboard for perforating printer messages, B' is in a closed branch extending to the bar $M^4$; but in Fig. 17 the branch containing magnet B' contains a circuit-breaker, by which it is opened at each depression of the space-key and shortly before the spring $q^4$ of the common break is forced by the arm $q^2$ into contact with the screw $q^3$. As shown in Fig. 5 and as already explained, the branch including magnet B' is not broken while perforating printer messages, but such branch is broken, as shown in Fig. 17, while preparing messages for the Morse code. Again, in the system of Fig. 5 it becomes necessary in one instance to shorten the feed of a character—namely, that character or group of perforations marking the commencement of lines in printer messages. This is done, as shown in Fig. 5, by a switch consisting of an arm $l^3$, pivoted at $n^5$, which may be moved to make connection either with contact $n^3$ or $n^4$. When in connection with $n^3$, the operation of the line-marking key brings into action the feed-magnet $H^8$, and the paper strip is fed a space represented by the seven pairs of holes perforated near the margin, plus one central hole beyond. When, however, the arm $l^3$ is connected with contact $n^4$, the feed-magnet $H^7$ instead is brought into action, and the paper strip is fed only the space of seven central holes, whereby the tape may be perforated with a continuous series of holes seven pairs at a time.

Fig. 21 shows the letters $a\ b\ c$ as terminating a line of a printer message and a new line commenced by the character consisting of seven pairs of holes and a terminal space, which is followed by the letters $a\ b\ c$, &c.

Fig. 22 shows three line-marking groups as they would be made if the switch-arm $l^3$ were upon the contact $n^3$ and the line-marking key were three times depressed, the paper tape being fed eight central holes at a step. Fig. 23, however, represents the holes in the tape that are made by depressing the line-marking key three times, the switch $l^3$ being in contact with $n^4$. In this case the paper tape is fed but seven central holes at a step, and as a consequence a continuous series of perforations, representing Morse dots, is produced.

Fig. 24 shows the letters $a\ b\ c$ as perforated for the type printer system and an erasure or rub-out of characters already perforated at the beginning of a line. The erasure is effected by disconnecting the feed-wheel of the perforator, drawing the tape back into the punch-head from where the error began to the beginning of the line, which is indicated by a line-marking group, reconnecting the feed-wheel, then moving the switch $l^3$ to contact $n^4$, and successively depressing the line-marking key until the tape has been perforated and fed to a point where the error had occurred, or somewhat beyond, to insure a complete rub-out. When this point is reached, switch $l^3$ is returned to the point $n^3$ and the line-marking key is depressed and a new line is commenced, as though no error had occurred.

In diagram 5, $B^2\ B^2$ represent the two assisting-magnets of the perforator, and I is the magnet for releasing the feed-wheel, while $l^2\ l^3$ is the circuit-closer for the branch containing said magnet, which, as appears from Figs. 1 and 2, is actuated by the assisting-magnet $B^2$ at the left. As will now be understood, the feed-controlling magnets $H'$ to $H^9$, the punch-actuating magnets $B'$ to $B^{16}$, the assisting-magnets $B^2$, the releasing-magnet I, and its circuit-controller $i^2 i^3$ are made as parts of the perforating apparatus shown in Figs. 1 to 4. The common break apparatus and key-levers K of our keyboard are preferably made a part of the superstructure, while contact-levers O and contacts $l^2$ are made a part of the substructure. The switch $l^3$ is permanently placed in close proximity to the keyboard and within easy reach of the operator. Again, the circuit-breaker $B^{30}\ B^{31}$, (shown in Fig. 17 and elsewhere in the drawings,) like the common break apparatus $q^2\ q^3\ q^4$, is made part of the superstructure for the Morse code. In adapting our system for the American Morse code we also place upon the table, within convenient reach of the operator, a multiple switch having eight metallic arms $q^{20}$ to $q^{27}$, which are pivoted at points $s^{40}$ to $s^{47}$ and to which is connected a bar of insulating material $B^{20}$, provided with a handle $B^{21}$. By means of this switch double or additional spacing may be effected. With the switch in its lower position there will be produced by the operation of the perforator single spacing between letters and additional spacing between words, while in its upper position there will be double or additional spacing. Thus, if there were a word containing a spaced letter, thereby rendering it necessary to double space between each letter of the word, the switch would be moved to its upper position before making the space following the preceding word. This would result in additional spacing before the word in which double spacing between letters was necessary, and with the switch retained in such position there would be double spacing produced between all letters of the word and between such word and the one following.

Figs. 25, 26, and 27 illustrate the necessity for double spacing and operation of our system in this respect. Fig. 25 shows the word "Erie" with single spacing between letters, while Fig. 26 represents the word "Erie" double-spaced, a repetition of the word also double-spaced, and an additional spacing between the two words. Fig. 27 shows some of the letters of the American Morse code in which errors are likely to occur in the absence of double spacing—that is to say, without double spacing or with normal spacing the letter "i" immediately succeeding letter "e" could not be distinguished from letter "r," nor could letter "e" immediately following letter "i" be distinguished from "c." This difficulty leads to many errors where the operator is aided by the context of the message, while in cipher messages, where there is an absence of context which may be understood by the operator, the message becomes unreadable.

The operation of the double-spacing switch (shown in Fig. 17) is as follows: If when in its lower position a key of the keyboard is operated, the key will cause its corresponding contact-arm O to come in contact with its stop $l^2$ and will direct current through a corresponding bar of the switch and thence to one of the feed-magnets. The lower bar of the switch would bring into action feed-magnet H', while if the switch were lifted to its upper position current would be sent to the feed-magnet $H^2$. Thus by raising the double-spacing switch any finger-key, with one exception, would bring into action a feed-magnet one farther along in the series than if said switch were kept in its lower position. Double spacing of characters made by the key actuating the uppermost contact-lever O, Fig. 17, would obviously be impossible except by providing an additional feed-controlling magnet $H^{10}$. The double-spacing switch of Fig. 17, like switch $l^3$ of Fig. 5, is made a permanent part of the connections between the substructure of the keyboard and the perforator proper; but while preparing printer messages said switch should ordinarily be kept in its lower position, as it seldom happens that double spacing in preparing such messages would be necessary. Likewise while preparing Morse messages the switch $l^3$ of Fig. 5 should be permanently retained in its upper position, as a continuous series of dot perforations in the tape would seldom be necessary.

It is more convenient to place the double or additional spacing apparatus, or that part within control of the operator, in permanent relation with the perforator and in a position independent of the superstructure of the keyboard. However, the invention is in no wise limited to this specific adaptation, as such device or the manually-operated part thereof might without departing from the generic invention be placed within or upon the superstructure or elsewhere within the perforating system, nor is the invention limited to a multipoint-switch in an electric system. The invention would be present in any apparatus if there were a means present for effecting a prolonged feed over that normally employed, which might at the will of the operator be brought into action.

Fig. 14 is an isometric view of a frame, preferably of iron or brass, which is adapted either for the superstructure of the keyboard for preparing type-printed messages or for those of the Morse code. As here shown, G' G' are side pieces which are held together by a cross-bar G at one end, an intermediate bar $G^3$, and a plate $G^2$ at the front end of the keyboard. Between plate $G^2$ and bar $G^3$ are formed rising steps $s^{22}$, upon which are placed cross-bars $s^{21}$, carrying blades $m^{30}$ for separating the finger-buttons $m'$ of the keys K K', as shown in Figs. 7, 8, 9, and 20. Upon the bottoms of side pieces G' are four vertically-adjustable projections $q^{10}$, which are adapted to set within the four corresponding cavities of the substructure-base shown in Figs. 13 and 15. By this means a superstructure for one code may readily be removed and replaced by that of another, the only precaution required being that the supports $q^{10}$ shall be placed within the cavities of the base-plate and that the grooves or notches of the keys, hereinafter to be described, shall be properly placed over the chains or flexible cords $h$ of the substructure. A cross-bar $m^{21}$ is also attached across the lower edges of the bars G' of the frame shown in Fig. 14, and projecting upwardly from this bar and attached thereto is a slotted plate $m^{22}$, which serves as a comb for holding the finger-keys in place at the back end of the keyboard. One of the keys K', which for the most part is like those marked K, is shown in Fig. 12 with a downwardly-projecting hook $m$, which is placed underneath a cross-rod $m^{20}$ in such manner that said rod and comb may serve as a pivot-support. The slots of the comb $m^{22}$ hold the keys against sidewise movement, while the upper surface of a cross-bar $m^{40}$ prevents the hooks of the keys from dropping far below rod $M^{20}$. In this arrangement it will be apparent that the bar $m^{40}$ may be lowered and the keys inserted within the comb and under rod $m^{20}$, and that thereafter the bar and comb may be raised.

In adapting a superstructure for preparing printer messages several features are necessary which for the Morse code may be omitted. In preparing Morse messages, for instance, it is unnecessary to preserve a line arrangement of the messages. To perforate a tape for printer messages, and so that there may be a line arrangement in the printed sheet, we have shown in Figs. 6, 7, 8, 9, 10, 11, 12, and 16 a rotary registering device which is given a step of rotation by the depression of each and every key of the board. Moreover, by the perforation of a number of characters equal to the number in each line of the printed page the registering device is given a complete rotation, and upon the completion of such line a notch in a disk of the registering apparatus comes opposite a dogging-arm, into which it falls, and as the dogging-arm falls within the notch a bar is drawn under the free ends or tails of the keys, thereby preventing the downward movement of any key excepting one, or the additional perforation of a character. The key K', however, may yet be depressed, and to begin a new line it is touched by the operator. Such key is shown in Fig. 12, with its under inclined surface $P^{20}$, which in striking the locking cross-bar $P^{15}$ drives it backward, thus leaving the ends of keys K free to be again depressed in perforating another line.

Figs. 6 to 12 show a wheel W, bearing numbered divisions equal to those of the characters in lines of a printed page, which is supported upon a shaft $z^6$ within a bracket P P'. The shaft also carries a ratchet-wheel $z'$, which is rigidly attached thereto. Affixed to the wheel W is a disk L, within the periphery of which is a radial notch $x^5$ at a point corresponding with the zero-mark on the indicator-wheel W, and within such notch a toe $x^6$ of the arm $p^4$, Fig. 8, is permitted to drop at the completion of each line of the message. The arm $p^4$ is pivoted at $m^{13}$ and has joined thereto at point $p^{10}$ a horizontal bar $p^{11}$, which extends toward the front of the keyboard and at its end $p^{13}$ is pivoted to an upright arm $p^{14}$. Such arm is supported upon a rock-shaft $p^{12}$, which extends across the front of the keyboard and has at its opposite end a second upright arm $p^{14}$. The arms $p^{14}$ carry at their upper ends a cross-bar $p^{15}$, having a flat upper and a flat side surface next to the keys, and as the dog $x^6$ drops within the notch $x^5$ said bar $p^{15}$ is brought a short distance under the vibrating ends of the keys of the keyboard, excepting key K′. The beveled surface $p^{20}$ of key K′ is shown in Figs. 7 and 8 as well as in Fig. 12. As particularly shown in Fig. 11, the wheel W and notched disk L are fixed together and to the shaft in such manner that they must rotate therewith in a definite plane; but the shaft itself may be moved along its axis, there being a pin $z^2$ upon the shaft, which may slide within an axial groove of W and L. The ratchet-wheel $z'$ being rigidly affixed to the shaft $z^6$ must not only rotate therewith, but partakes of its longitudinal movement as well. By pressing a knob $z^5$ the ratchet-wheel $z'$ may be thrust to the left to clear the teeth of the escapement-pallets by which it is driven or controlled, and when so moved a spring $z^3$ is compressed, which when the pressure is removed returns the wheel $z'$ into connection with the pallets. The wheel $z'$ is also provided with a pin $z^{12}$, which is adapted to be arrested by a long horizontal stationary stop-pin $z^8$ after the wheel has been turned to its zero position. If after the perforation of a few characters it were attempted to disconnect the teeth of the escapement-wheel from their pallets and to return the wheel to its zero position by first pushing knob $z^5$ and then turning it, pin $z^{12}$ would strike the side of stop-pin $z^8$, and if pin $z^{12}$ were rigidly fixed to the wheel it could not be moved away from the pallets. To avoid this possible difficulty, the pin $z^{12}$ is made free to slide within the wheel. The pin is provided with a shoulder, as seen in Fig. 11, against which presses a spiral spring $z^{11}$, the other end of said spring being confined in a housing or thimble $z^9$, which is rigidly fixed to the disk $z'$. Thus it will be seen that if knob $z^5$ were pressed inward when the end of $z^{12}$ were opposite $z^8$ the end of pin $z^{12}$ would be pressed backward within the disk by the stop $z^8$; but upon turning the knob $z^5$ the spring within $z^{11}$ would assert itself and would thrust pin $z^{12}$ outward after passing the stop $z^8$ into a position to be finally arrested by the end of said stop. Pallets $s^9$ for driving or controlling the ratchet-wheel $z'$ are mounted upon a downwardly-projecting arm $s^8$, which is loosely supported upon a shaft $s^6$, while rigidly connected to the shaft close to said arm is an arm $s^5$, which upon the depression of any finger-key of the keyboard strikes an adjustable projection $s^{11}$, which is rigidly attached to the arm $s^8$, carrying the pallets, and by this means, as appears from Fig. 7, the finger-keys may be depressed a considerable distance before arm $s^5$ reaches the pin $s^{11}$ to move the pallets. Normally the pallet-arm $s^8$ is drawn toward the right by spring $s^{10}$, one end of the spring being attached to the pallet-arm and the other to fixed support $s^{12}$. Arm $s^5$ is rigidly attached to rock-shaft $s^6$, which carries at its opposite end or at the other side of the keyboard a common break apparatus, by which the common return-circuit of the perforating system is opened and closed with each depression of a key and is so timed as to close said circuit shortly after the individual branches are connected by the contact-levers O and to break the same shortly before the contacts are separated by said levers. By this means the spark of the system is taken up between point $q^3$ and spring $q^4$ of the common break. Spring $q^4$ is attached to a vibrating arm $q^2$, having a horizontal hook which receives motion from rock-shaft $s^6$, to which are attached side arms carrying, at their free ends, a rod $s^7$, the latter being normally held in an upward position by springs $m^{15}$, which are supported from a cross-bar $m^{16}$—a bar from which the key-lever springs $k^{10}$, one for each key, are also hung. It will thus be seen that the keys are normally held in an upward position by springs $m^{15}$ and $k^{10}$ and that upon depressing any key of the keyboard its spring $k^{10}$ and spring $m^{15}$ will be elongated, and that the projection $x'$ seen upon the lower sides of the keys, as in Figs. 7, 8, and 12, will press the cross-bar $s^7$ downward until said bar is arrested by stops $s^{20}$. By so depressing bar $s^7$ the rock-bar $s^6$ is rotated and the arm $s^5$ brought into connection with the projection $s^{11}$, thereby causing the escapement-pallets to move to their extreme left position. At the same time rock-shaft $s^6$ is rotated at its opposite end, and with it an arm which carries a pin $k^5$, and as the pin $k^5$ passes within a slot $k'$ of an auxiliary arm, which is rigidly affixed to the shaft bearing the common break-arm $q^2$, both the register and common break are operated in unison one with the other. The slot $k'$ within which the pin $k^5$ vibrates may be lengthened or shortened at the pleasure of the operator by a latch-piece $k^6$, also having a slotted opening whereby it may be clamped in a higher or lower position to increase or diminish the length of that part of slot $k'$ within which $k^5$ vibrates and by which lost motion is obtained at the common break. These adjustments of the common break, as well as the adjustability of the contacts $s^{11}$ of the escapement-pallets of the register, are essential, as it is necessary that these two devices should work in unison and that both should have a considerable amount of lost motion. The pallets should never cause the register to be turned a step, except as the common break is closed. As no character can be perforated without closing the common break, it would lead to confusion if the indicator were to show a character perforated when such had not been the case. On the other hand, the register must not fail to move a step upon closing the common break, for upon closing the common break a character will be perforated, and it would also lead to confusion if such perforation were not indicated. In other words, if the registering apparatus and the common break were not to operate in unison seventy-five characters instead of seventy-four might be perforated for a line, or perhaps but seventy-three. Lost motion at the common break is also necessary to quicken its action, while at the register it would be desirable if for no other purpose than to lighten the action of the keyboard under the operator's touch.

Another feature of our present improvements is a registering device for indicating the number of lines that at any time have been perforated. A device for this purpose is particularly shown in Figs. 6 to 10. During the normal operation of the keyboard the tooth $x^6$ of the bar $p^4$ rests upon the periphery of the wheel L, where it is held under the tension of spring $x^7$, one end of which is fixed to a connecting-screw $s^{13}$; but when notch $x^5$ of the disk comes opposite toe $x^6$ the spring $x^7$ quickly draws the toe within the notch. By this means the arm $p^4$ is given one movement for each line of the message perforated, and this movement we convey to a rotary indicator X by means of an arm $m^{12}$ and a driving-pallet $m^{14}$. The pallet $m^{14}$ engages the ratchet-teeth of wheel $m^{10}$, while upon said arm $m^{12}$ is an auxiliary tooth $s^{25}$, which, with each movement of arm $m^{12}$, is brought within the notches of the ratchet-wheel to prevent overthrow or a movement representing more than one tooth of the wheel at a step. A pawl $m^{11}$, as shown in Fig. 7, is also provided to prevent back movement of the ratchet-wheel.

The operation of the registering apparatus and devices for locking the keys of the perforator at the end of each line will now be apparent. The lock is released as follows: The key K', which is indicated among the various keys as "rub-out," serves when depressed to thrust back the locking-bar $p^{15}$—that is to say, the inclined surface $p^{20}$ of key K' drives said bar back far enough to permit keys K to be depressed. The depression of key K' also causes the pallets of the indicator to be operated at the same time that the tooth $x^6$ is withdrawn from notch $x^5$ of the disk L, or, to be more precise, the tooth $x^6$ is withdrawn from the notch slightly in advance of the movement of the pallets. The pallets, however, are actuated by the same depression of key K', and by this means after the toe $x^6$ is removed from the notch $x^5$ the wheel is driven sufficiently far that the end of the toe will rest upon the periphery of disk L upon removing the pressure of the fingers from key K'—that is to say, the movement of key K' which removes toe $x^6$ from its notch $x^5$ will rotate the disk into such position as to make it impossible for the toe $x^6$ to thereafter drop into the notch. Again, it will be seen that in this construction the line-marking key K' may be repeatedly operated without interfering with the register which indicates the number of lines. When the disk L is locked, the depression of the line-marking key will move the locking-bar $p^{15}$ backward and draw the toe $x^6$ out of the notch $x^5$, thereafter leaving the toe $x^6$ supported upon the outer periphery of L, and while the toe is supported in this position the arm $m^{12}$ and pawl $m^{14}$ will be held well back from the teeth of wheel $m^{10}$.

In our machine for receiving messages in page form we employ but thirty-two characters in addition to the group representing the commencement of a new line. For this reason there are but three rows of finger-keys required, and, as shown in Figs. 6, 7, and 8, it is only necessary to employ three of the cross-bars $s^{21}$, upon which the separating-blades $m^{30}$ are mounted; but for the Morse code more characters are ordinarily employed, thus rendering four rows of keys and four such bars necessary. The side pieces G', however, are so constructed that without modification either three or four such cross-bars may be employed, as occasion may require.

We are aware that it is not broadly new to place stationary blades or guides between finger-keys to prevent the operator from simultaneously depressing two keys; but we believe it to be new with us to separate the several rows of keys of a keyboard by bars $s^{21}$, having blades $m^{30}$, which may be readily placed upon or removed from the frame. Separating-blades of this character are particularly important in a keyboard for preparing printed messages where a definite number of characters should be perforated for each line, and although desirable in keyboards for preparing Morse they are not indispensable.

Fig. 16 represents a plan view of the frame of our superstructure shown in Fig. 14 when adapted to prepare printer messages. In this drawing the space-key is shown as consisting of side bars $m^{32}$, which are pivoted upon the ends of rod $m^{20}$ outside of the side plates G' and a cross-bar at the front of the frame upon which finger-piece $m^{31}$ is placed. To the side bar $m^{32}$ at the right of the keyboard is an inwardly-projecting pin $m^{33}$, which upon the downward movement of $m^{31}$ depresses the first key K of the series. The key-levers are all constructed in one piece, as shown in Fig. 12, with the exception of the finger-buttons, which are mounted upon the upwardly-projecting shanks $m'$, and each key is provided with a slight lower projection $x'$, which upon depressing them comes in contact with the vibrating bar $s^7$, thereby turning rock-shaft $s^6$ to actuate the common break and the line-registering apparatus. Each key is also provided with downward notched projections x x for bringing into action the various parts of the perforator.

The perforator shown in Figs. 1 to 4 has nine different steps of feed for the feed-wheel, nine respective magnets for controlling said steps, nine circuits leading from said magnets to the keyboard, and in the keyboard there are nine chains for controlling the nine steps of feed action.

Many letters are of equal length, and the keys represented by such letters all act upon one chain, and in such cases the feed-notches x of the keys all occupy the same lengthwise position; but for letters of different length the feed-notches must be differently placed along the lengths of the keys. In addition to the notched projections for controlling the feed there are on each key in preparing printer messages five notches for controlling the punch-magnets. These notches are variously distributed along the lengths of the keys and in such manner that a key may depress those chains which actuate the particular levers O which close the branches leading to the magnets of the required punches. For example, as will be seen from Fig. 21, the first, third, and fourth punches of the upper row and the second, third, and fourth of the lower row must be brought into action to perforate the letter "a", while the letter "b" will be perforated by actuating the first, third, and fifth of the upper punches and the first, fourth, and fifth of the lower row, and the letter "c" is perforated by bringing into action the first, third, and fourth of the upper row and the second, third, and fifth of the lower. It will also be noticed from this figure that in perforating the letter "a" the fifth feed-magnet must be actuated, while the sixth is employed for "b" and "c". When the line-marking key is depressed, the first seven punch-magnets in both the upper and lower rows are actuated and with them the eighth feed-magnet. In using the line-marking key, however, for an erasure the same number of punch-magnets will be operated, but the seventh feed-magnet instead of the eighth will be brought into action.

Referring now to Figs. 18 to 20, which show our keyboard adapted for the Morse code, it will be seen that the superstructure is substantially the same as the superstructure for preparing type printer messages, except that for Morse more keys are employed, while several of the parts employed in the other superstructure may be and are omitted. The registering apparatus might be employed upon the Morse board to indicate the number of letters or words perforated by an operator or for keeping an exact record of the matter transmitted in press reports. The register for such purpose could readily be adapted to indicate one hundred characters for each rotation of the indicator-wheel W, and so modified it could be used with the registering device for indicating the number of lines. In the Morse superstructure, as in the other, we employ the frame shown in Fig. 14, a common breaking apparatus, the rock-shaft $s^6$, and the bar $s^7$, which is depressed to actuate said common break each time a character is perforated; but in the Morse code the combination of the key-notches is materially different from those employed in preparing messages to be received upon the printer. In printer messages each letter is perforated by always bringing into action six punch-magnets and one feed-magnet. In perforating the Morse code, however, as few as two or as many as twelve magnets may be used for a character—for example, two are employed to perforate the letter "e," four the letter "o," four the letter "i," six the letter "c," and twelve the period. It may also be observed that upon depressing the space-key in preparing printer messages six punches are brought into action; but the space-key in preparing the Morse code should actuate no punch at all. A superstructure for perforating the Continental Morse code would involve no material change, except in the notches of the keys. In fact, many parts could be omitted, and particularly the double-spacing devices, since in such alphabet long spaces within the characters are not present.

What we claim, and desire to secure by Letters Patent, is—

1. The combination, in a perforating system, of a perforator having a series of punches, a feed-wheel having variable steps of movement, a keyboard having a substructure common to all codes, and superstructures carrying keys and other parts of said keyboard, each superstructure being individual in character and adapted to one particular code.

2. The combination, in a perforating system, of a perforator having a series of punches, a feed-wheel for feeding the paper tape step by step as each character is perforated, a keyboard consisting of a substructure, which is adapted to all codes, and two or more superstructures each of which is adapted to one code only, thus adapting the perforating system to many different codes by changing only a small part of the apparatus.

3. The combination, in a perforating system, of a perforator containing electromagnets for actuating the punches and feeding devices, a keyboard in which are employed a series of chains or cords, a series of contact-levers, a series of stationary contacts electrically connected with the magnets of the perforator, a series of key-levers for actuating said contact-levers, a device for indicating the perforation of a definite number of characters, a locking device controlled by said indicating device, and a locking-bar controlled thereby for arresting the further operation of perforating, and a key provided with means for releasing said lock, as and for the purposes set forth.

4. In a perforating system, the combination of a perforator having punches and feeding apparatus, a keyboard having a series of finger-keys and indicating apparatus which is actuated a step at a time by a depression of each key, a locking device controlled by said indicator for arresting the further action of the key-levers after the perforation of a predetermined number of characters, and an auxiliary key for releasing said lock, as and for the purpose set forth.

5. In a perforating system, the combination of a perforator having punches and feeding apparatus, a keyboard having a series of finger-keys, a registering mechanism which is moved a step at a time by the depression of each key, a locking mechanism controlled by said registering apparatus, an auxiliary key for releasing said locking apparatus and moving the indicator an additional step, as and for the purpose set forth.

6. In a perforating system, the combination of a perforator having a series of punches and feeding apparatus, a registering apparatus for indicating the number of characters perforated, a locking device controlled by said registering mechanism for arresting the further action of the key-levers after the perforation of a predetermined number or group of characters, an auxiliary key which, when depressed, releases said locking device and effects an additional step of rotation of the registering apparatus, and an auxiliary registering device for indicating the number of groups perforated, each group representing a line in pages printed upon a receiving-machine.

7. In a perforating system, the combination of a perforator having punches and feeding apparatus, a keyboard having a series of key-levers, a registering apparatus for indicating the number of characters perforated, a locking device controlled by said indicator which arrests the further action of the key-levers after the perforation of a predetermined number or group of characters, and an auxiliary register which is actuated by and in conjunction with the locking apparatus to indicate the number of groups of characters perforated.

8. In a manual keyboard arrangement, the combination of a series of key-levers, a registering-wheel, W, a locking-disk, L, a dog, $x^6$, a ratchet-wheel, $z'$, driving or escapement pallets therefor actuated by said key-levers, a link $p^{11}$, locking-bar $p^{15}$, and an auxiliary key $K'$, as and for the purpose set forth.

9. In a keyboard arrangement, the combination of a series of key-levers, an indicating-wheel, W, a notched disk L, attached thereto, arm $p^4$ carrying a dog $x^6$, link $p^{11}$, arms $p^{14}$, a locking-bar $p^{15}$, an auxiliary key $K'$ for withdrawing the dog $x^6$ from the notch $x^5$, ratchet-wheel $z'$, and escapement or driving pallets $s^9$ which are actuated by the keys of the keyboard, as and for the purpose set forth.

10. In a keyboard having a series of key-levers, an indicating-wheel W, locking-disk L, driving or escapement pallets $s^9$, a ratchet-wheel $z'$ which is movable lengthwise of its axis, and a handle and stop whereby said ratchet-wheel may be disengaged from its pallets and rotated to a zero position, as and for the purpose set forth.

11. In a keyboard, the combination of a series of finger-keys, an indicating-wheel W, locking-disk L, a ratchet-wheel and escapement-pallets for actuating the indicating-wheel a step at a time by the depression of key-levers, a ratchet-wheel which is movable along its axis to disengage its teeth from the driving or escapement pallets, a handle or knob $z^5$ for moving said wheel along its axis and for rotating said wheel to a zero position, a stationary stop $z^8$ and a pin $z^{10}$, yieldingly mounted within said ratchet-wheel, as and for the purpose set forth, whereby at any point of rotation said ratchet or escapement wheel may be disengaged from its pallets and, with the indicating-wheel, rotated to a zero position.

12. In a keyboard arrangement, the combination of a series of key-levers, a rock-shaft $s^6$ actuated thereby, an arm $s^5$ rigidly connected therewith, an escapement-anchor, having pallets $s^9$, loosely pivoted upon said shaft which are vibrated by said arm $s^5$, a ratchet or escapement wheel which is actuated or controlled by said pallets, an indicating-wheel W, and a common break apparatus for opening and closing an electric circuit in unison with the step-by-step action of said indicator.

13. In a keyboard arrangement, the combination of a series of key-levers, a rock-shaft $s^6$ actuated thereby, a vibrating arm carrying pallets $s^9$, a ratchet-wheel driven or controlled thereby, an indicating-wheel W, a locking-disk L, a locking-arm $p^1$, a locking-bar for arresting the further action of the key-levers at a predetermined point in the rotation of the indicating-wheel, and a common break apparatus actuated by said rock-bar $s^6$ for opening and closing an electrical circuit in unison with the movement of said indicator-wheel.

14. In a keyboard arrangement, the combination of a series of key-levers, rock-shaft $s^6$, pallets $s^9$, a ratchet-wheel $z'$ actuated or controlled by said pallets, an indicating-wheel W, a locking-disk L, a locking-arm $p^1$, a locking-bar $m^{15}$ for arresting the further action of the key-levers, an auxiliary key $K'$ for releasing said locking apparatus, an indicator X, a ratchet-wheel $m^{10}$ connected therewith, and a pallet $m^{14}$ operated in conjunction with arm $p^1$ at a predetermined point in the rotation of the indicator W, as and for the purpose set forth.

15. In a keyboard arrangement, a series of finger-keys, side plates $G'$ $G^4$, having a series of steps $s^{22}$, cross-bars $s^{21}$ and blades $m^{30}$ mounted thereon for separating the buttons of the key-levers, as and for the purpose set forth.

16. In a keyboard arrangement, the combination of the keyboard-frame and a series of cross-bars, $s^{21}$, from which project blades $m^{30}$, whereby said keys are so separated that upon touching one, the operator cannot inadvertently depress another.

17. In a perforating system, a perforator having punches and feeding apparatus for moving a paper tape through steps of variable length, electromagnets for actuating said punches and variable step-feeding apparatus, a keyboard for controlling said perforator and means whereby the lengths of the various steps of the feed movements may be increased for the purpose of double spacing between letters or between words, as and for the purpose set forth.

18. In a perforating system, the combination of a perforator having punches, a feed-wheel for moving a paper tape through variable steps of movement, and means for increasing the length of each step of feed movement whereby double or additional spacing between letters and words may be effected.

19. In a perforating system, the combination of a perforator having a series of punches, a feeding device for feeding the paper tape through variable steps of movement, a series of electromagnets, one to control each of the different steps of movement of the feed-wheel, and a switching device whereby, at the pleasure of the operator, a feeding-magnet may be brought into action in advance of the one which would be normally operated.

20. In a perforating system, the combination of punching devices, a variable feed apparatus a series of magnets $H'$ to $H^9$ for controlling said feed apparatus, and a multiple switch having movable connecting-pieces $q^{20}$ to $q^{27}$, as and for the purpose set forth.

21. In a perforating system, the combination of a keyboard having a series of key-levers, a series of contact-arms actuated thereby, a common closing and breaking apparatus in the common return-circuit of said perforator, and a circuit-breaking contact in one branch which is actuated by the space-key to break said branch as the common return-circuit is closed, as and for the purpose set forth.

22. In a perforating system, the combination of a series of punches actuated by electromagnets $B^2$ to $B^{16}$ in separate branches, contact-levers controlled by said keys for opening and closing said magnet branches, a punch-magnet $B'$, a breaking device for opening the circuit of punch-magnet $B'$ upon the depression of one of the keys of the keyboard, and an apparatus for closing and breaking the common return-circuit.

23. In a perforating system, the combination of a perforator having a series of punch and feed magnets, a line-marking key and a feed-controlling magnet switch whereby one feed-controlling magnet or another may be brought into action, as it may be desired to merely mark the commencement of a new line in preparing printer messages, or to erase or rub out a part of a message already perforated.

24. In a perforator system, the combination of a perforating-machine and a feed-wheel for moving the tape therein, a line-marking key and means whereby, upon the depression of said key, the paper tape may be fed a greater or less distance, according to the purpose for which said key is at the time used.

CHARLES L. BUCKINGHAM.
EMIL GERMANN.

Witnesses:
JOHN C. SANDERS,
ROBT. F. DOYLE.